United States Patent
Narayanan et al.

(10) Patent No.: US 7,539,759 B2
(45) Date of Patent: May 26, 2009

(54) SESSION ENDPOINT MANAGEMENT PROTOCOL

(75) Inventors: Sathya Narayanan, Plainsboro, NJ (US); Daisaku Komiya, Lawrenceville, NJ (US); Rajesh Khandelwal, Bridgewater, NJ (US)

(73) Assignee: Panasonic Corporation, Osaka (JP)

( * ) Notice: Subject to any disclaimer, the term of this patent is extended or adjusted under 35 U.S.C. 154(b) by 838 days.

(21) Appl. No.: 10/414,370

(22) Filed: Apr. 15, 2003

(65) Prior Publication Data
US 2004/0210657 A1  Oct. 21, 2004

(51) Int. Cl.
*G06F 15/16* (2006.01)

(52) U.S. Cl. ......................... 709/227; 709/228

(58) Field of Classification Search .............. 709/227, 709/228
See application file for complete search history.

(56) References Cited

U.S. PATENT DOCUMENTS

| | | | | |
|---|---|---|---|---|
| 6,134,433 | A * | 10/2000 | Joong et al. ............. | 455/417 |
| 6,304,556 | B1 | 10/2001 | Haas | |
| 6,442,404 | B1 * | 8/2002 | Sakajiri ............. | 455/557 |
| 6,996,370 | B2 * | 2/2006 | De Loye et al. ......... | 455/41.2 |
| 7,042,879 | B2 * | 5/2006 | Eschbach et al. ......... | 370/392 |
| 2002/0080090 | A1 | 6/2002 | Borgstom et al. | |
| 2002/0082015 | A1 | 6/2002 | Wu | |
| 2002/0115471 | A1 * | 8/2002 | De Loye et al. .......... | 455/552 |
| 2002/0186676 | A1 | 12/2002 | Milley et al. | |
| 2003/0088788 | A1 * | 5/2003 | Yang ..................... | 713/201 |
| 2003/0188010 | A1 * | 10/2003 | Raza et al. ............. | 709/238 |
| 2006/0004905 | A1 * | 1/2006 | Martino ................. | 709/200 |

FOREIGN PATENT DOCUMENTS

| | | |
|---|---|---|
| DE | 101 18 188 A1 | 10/2002 |
| EP | 1 107 512 A1 | 6/2001 |
| EP | 1 235 387 A1 | 8/2002 |
| WO | WO 02/23833 A2 | 3/2002 |

OTHER PUBLICATIONS

Z. J. Haas et al.; "Ad-Hoc Mobility Management with Randomized Database Groups"; 1999; http://citeseer.nj.nec.com/232462.html.
"Bluetooth Device Discovery, How Devices Find Each Other"; http://www.xilinx.com/esp/bluetooth/pdf_files/device_discovery.pps.

(Continued)

*Primary Examiner*—Nathan J Flynn
*Assistant Examiner*—Mohamed Wasel
(74) *Attorney, Agent, or Firm*—RatnerPrestia

(57) ABSTRACT

A protocol for extending session endpoints in an ad-hoc network environment first performs device discovery to determine local devices within its coverage area and the capability of those devices. These local devices then exchange session descriptions with the endpoint device. If the current session may be supported by one of the local devices, the endpoint device, responsive to a command from an user, transfers the session endpoint to the local device and the endpoint device acts as a proxy for the local device in the session. Optionally, if the local device has a path to the correspondent node that is independent of the path through the endpoint device, it establishes the session along this path and then signal the endpoint node to terminate its session.

20 Claims, 17 Drawing Sheets

OTHER PUBLICATIONS

S. Corson et al.; "Mobile Ad hoc Networking (MANET): Routing Protocol Performance Issues and Evaluation Considerations"; Jan. 1999; http://www.ietf.org/rfc/rfc2501.txt.

M. Handley et al.; "SDP: Session Description Protocol"; Apr. 1998; htp://www.networksorcery.com/enp/rfc/rfc2327.txt.

C. Adjih et al.; "Optimized Link State Routing Protocol"; Mar. 3, 2003; http:/www.ietf.org/internet-drafts/draft-ietf-manet-olsr-08.txt.

J. Rosenberg et al.; "SIP: Session Initiation Protocol"; Jun. 2002; http://www.ietf.org/rfc/rfc3261.txt.

D. B. Johnson et al.; The Dynamic Source Routing Protocol for Mobile Ad Hoc Networks (DSR); Feb. 2, 2003; http://www.ietf.org/internet-drafts/draft-ietf-manet-dsr-08.txt.

C. E. Perkins et al.; "Ad hoc On-Demand Distance Vector (AODV) Routing"; Feb. 17, 2003; http://www.ietf.org/internet-drafts/draft-ietf-manet-aodv-13.txt.

M. Garcia et al.; "Fishey State Routing Protocol (FSR) for Ad Hoc Networks"; Dec. 17, 2002; http://www.ietf.org/internet-drafts/draft-ietf-manet-fsr-03.txt.

Z. J. Haas et al.; "The Zone Routing Protocol (ZRP) for Ad Hoc Networks"; Jul. 2002; http://www.ietf.org/internet-drafts/draft-ietf-manet-zone-zrp-04.txt.

* cited by examiner

SESSION ENDPOINT MANAGEMENT PROTOCOL

BACKGROUND OF THE INVENTION

The present invention concerns ad-hoc networks and in particular a protocol for manipulating session endpoints in an ad-hoc network environment.

Recent advances in wireless communication technologies coupled with increased capabilities and decreased cost of computer technology have enabled wireless computing applications that had previously been either prohibitively expensive or too bulky for portable devices. Many such applications may be built on a network structures known as mobile ad-hoc networking (MANET). Ad-hoc networks are formed dynamically using groups of mobile computing nodes that have changing connectivity. To operate efficiently, it is desirable for these networks to include the routing functions in each node. Due to the short-range nature of these devices, a communication channel between devices may traverse several intermediate nodes between its source and destination. Because each traversal is known as a "hop," these networks are referred to as multi-hop networks.

By implementing routing functions in the nodes, these networks allow quick reestablishment of paths between two connecting nodes if an intermediate node can no longer be a part of the network. If, for example, one path between communicating nodes disappears because a device used for one of the hops is no longer able to communicate with other nodes in the group, a secondary path that does not need the missing node may be quickly defined.

Many possible protocols have been defined to implement ad-hoc networking. These include Ad hoc On-Demand Distance Vector (AODV) Routing, Dynamic Source Routing, Optimized Link State Routing and Topology Broadcast Based on Reverse Path Routing. All of these protocols are described on a web-site maintained by the Mobile Ad-Hoc Network working group of the Internet Engineering Task Force (ITEF).

To date, mobility management has been largely concerned with two problems: handoff management and location management. Handoff management concerns the maintenance of an active session between a mobile node and a correspondent node in a mobile network while the mobile node is moving. When a mobile node leaves the coverage area of its current base station and enters the coverage area of a new base station, handoff between the current base station and the new base station keeps the session active. This problem is addressed by existing protocols, such as the Mobile IP protocol described in RFC 2002.

Location management concerns the problem of locating a mobile node in a network when it is not actively communicating. This may be desirable when, for example, the network receives an incoming call, directed to the mobile node. To solve this problem, the network finds a base station having a coverage area that includes the mobile node. The location management problem has been addressed in IETF protocols, for example, the Mobile IP protocol, referenced above.

SUMMARY OF THE INVENTION

The present invention is embodied in a protocol that may be used to manage session endpoints in an ad-hoc network environment. An endpoint device using a protocol according to the subject invention identifies local devices within its coverage area and, optionally, exchanges device capabilities with those devices. These local devices then exchange session descriptions with the endpoint device. If the current session may be supported by one of the local devices, the endpoint device may move the session endpoint to the local device. The previous endpoint device then acts as a proxy for the local device.

According to one aspect of the invention, the session is copied to the local device such that the local device replicates the actions of the endpoint device in the session.

According to another aspect of the invention, the session is split such that parts of the session are sent to respectively different local devices.

According to yet another aspect of the invention, a split session shared among multiple local devices is merged into a single session.

According to another aspect of the invention, the endpoint device receives an incoming session addressed to the local node and moves the session endpoint to the local node to complete the incoming session.

According to another aspect of the invention, an outgoing session from the local device by causing the endpoint device to generate a session and then to move the session from the endpoint device to the local device.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION

The subject invention is embodied in a protocol that manages session endpoints in an ad-hoc network. By manipulating the endpoint of a session, this protocol allows a user to achieve device independent communication; a user may select, from a group of available devices in a particular environment, the best device or devices to process the session data. The present protocol includes six operations: MOVE, COPY, SPLIT, MERGE, INCOMING SESSION and OUTGOING SESSION. This protocol does not affect the underlying transport protocol that is used in the session nor does it affect any other protocol that may be used in the session. Parts of the present protocol may be implemented using other protocols, such as the Bluetooth® device discovery protocol or the Internet Session Description Protocol (SDP), both of which are described below. The exemplary protocol may be implemented at or above the session layer in the seven-layer Open Systems Interconnection (OSI) model.

Figure 1:
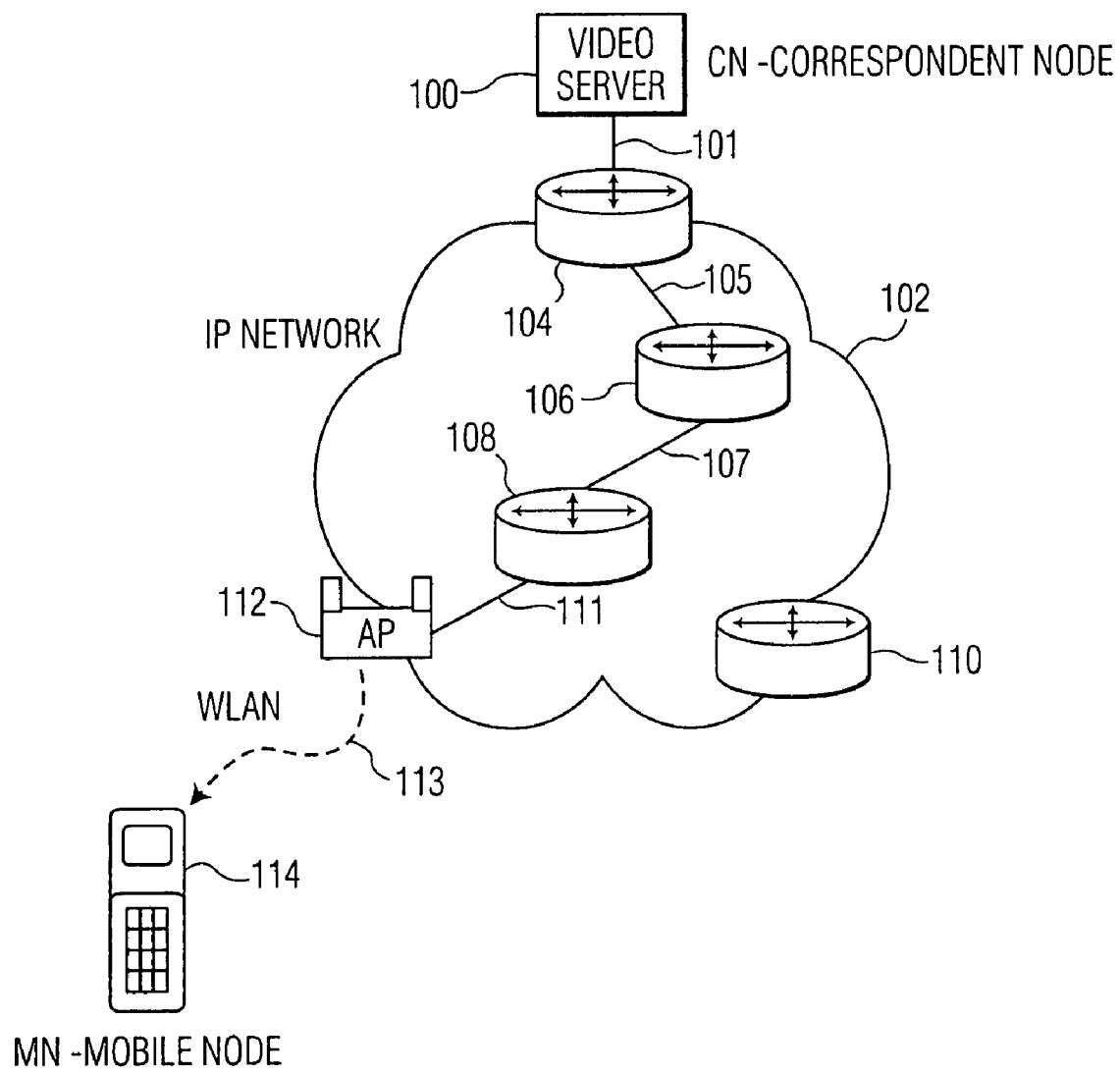
FIG. 1 (prior art) is a block diagram of an Internet protocol (IP) network including a wireless local area network (WLAN) and a mobile device that is useful for describing the environment in which the subject invention operates.

FIG. 1 is a block diagram of an IP network 102 that includes nodes 104, 106, 108 and 110. This network, which is referred to herein as the primary network, may be wired or wireless. The primary network also includes an access point 112 through which a wireless device 114, for example, a wireless telephone having video capability, may communicate with the network. In the example described below, a video server 100 is also coupled to the network 102, serving as a correspondent node with the mobile note 114. In this example, a session is established between the mobile telephone 114 and the video server 100. The video server 100 provides a video program requested by the mobile telephone 114. To request and provide this program, a connection 101 is established between the correspondent node 100 and node 104 of the network and connections 105, 107 and 111 are established to nodes 106, 108 and the access point 112, respectively. The access point 112 has a wireless connection 113 with the mobile telephone 114. The session established between the video server 100 and the mobile telephone 114 has the telephone 114 as its primary endpoint.

The materials below describe several operations that are available through the protocol which allow the endpoint of this session to be manipulated. According to the protocol of the subject invention, one or more secondary endpoints in an ad-hoc network may be established so that the video programming sent to the telephone 114 may be displayed on a more appropriate device, so that video programming may be sent to one device while audio programming is sent to another device or so that a mobile ad-hoc network device that can not itself connect to the network 112, (not shown) may receive or initiate a session using the network 102 through the mobile node 114.

Figure 2:
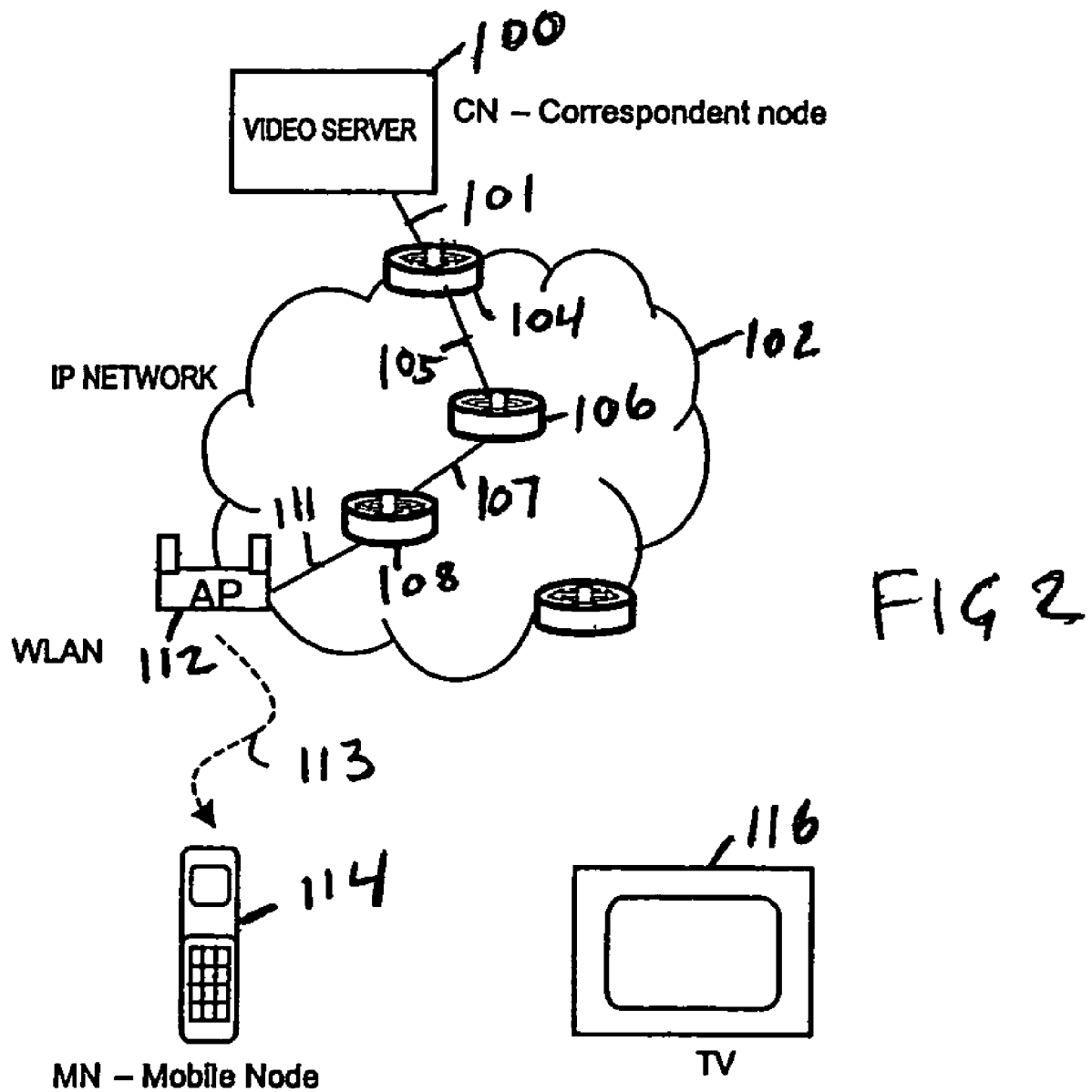
FIGS. 2 and 3 are block diagrams of the IP network shown in FIG. 1 with an ad-hoc network extension that are useful for describing the operation of the subject invention.

A basic operation of the protocol is to move the endpoint of a session. In FIG. 2, for example, the mobile node 114 is in a different location than in FIG. 1 but has maintained its connection 113 with the access point 112. In its new location, a television 116, also having a wireless data connection (not shown) is in the coverage area of the telephone 114. Because the television 116 is a more appropriate device for viewing the video program, the user may want to transfer the video signal from the telephone 114 to the television 116. This may be done, for example, by moving the session endpoint from the telephone to the television and configuring the telephone 114 to act as a proxy for the television 116. Before this may be done, however, it is desirable for the telephone 114 and the television 116 to discover each other and to exchange session information to determine whether the television can support the data from the telephone.

The process of extending the session from the telephone 114 to the television 116 is described with reference to the flow-chart diagram of FIG. 4. In the exemplary embodiment of the invention, both the telephone 114 and the television 116 periodically perform device discovery, step 410, to determine which devices are within their respective coverage areas. In this example, the telephone 114 discovers the television 116 using a device discovery protocol. This protocol, for example, may be the same as the device discovery protocol defined for the Bluetooth® wireless communication standard. Alternatively other device discovery techniques may be used. For example, each device may maintain a device descriptor that contains all relevant information and broadcast the descriptor in response to a request from another device. Alternatively, instead of transmitting a request, each device may simply periodically transmit the descriptor and listen for descriptors transmitted by other devices to determine the properties of devices in its coverage area. According to these protocols, device discovery may also include device capability exchange.

If the device discovery performed in step 410 does not include device capability exchange, it may be desirable for the devices to exchange their capabilities as shown in step 412. In device capability exchange, each device may transmit, for example, information about itself, such as its display size, media encoders/decoders (codecs) and bandwidth. This exchange transfers one or more packets between the endpoint and at least some of the discovered devices so that the current endpoint node, for example telephone 114, can discover the capabilities of the other devices in its coverage area.

The device capability exchange step 412, may be skipped, as shown in phantom by the alternate path 411, if, as described below, the information obtained by device capability exchange may be obtained in step 420, the control signaling and session description negotiation step, described below.

Figure 3:
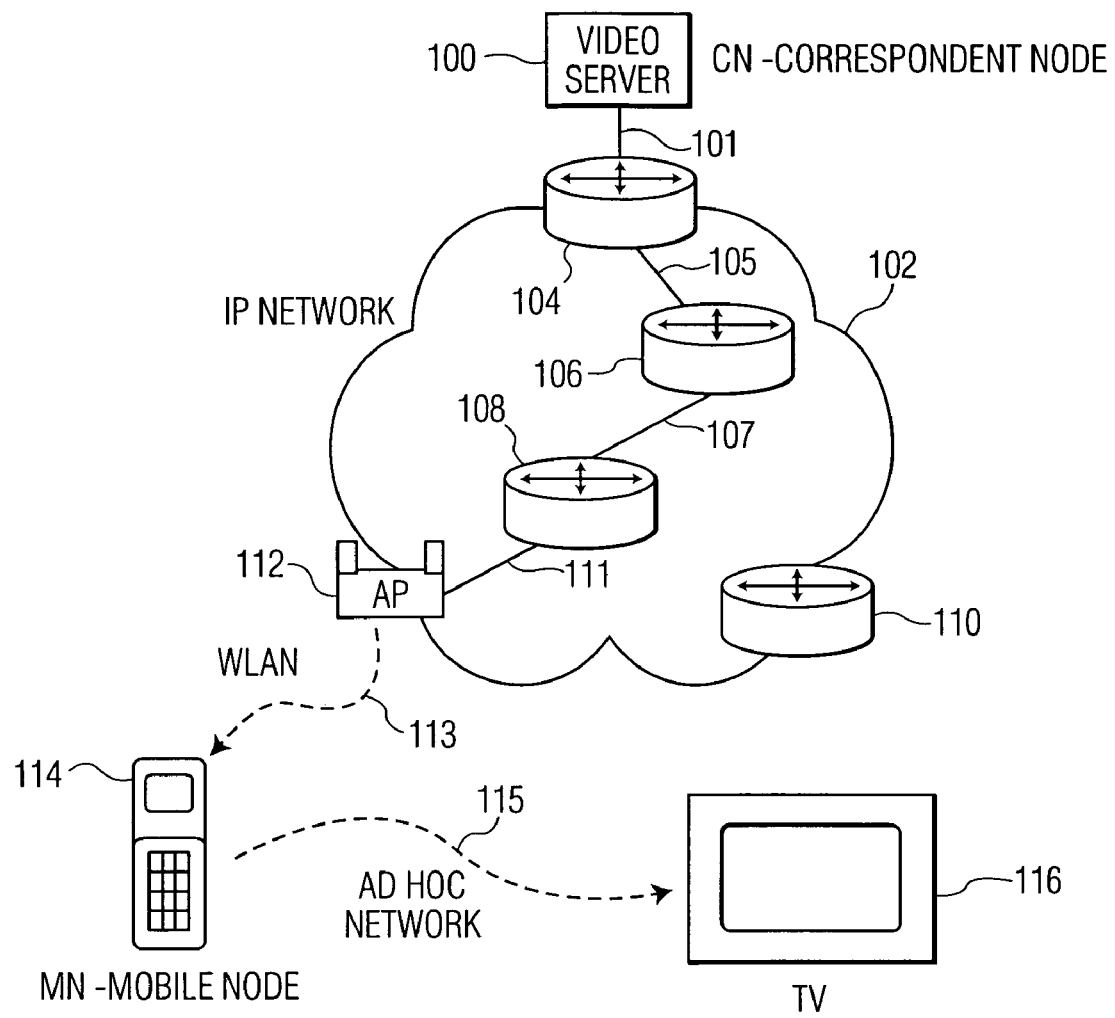

In the exemplary embodiment of the invention, each wireless device may periodically broadcast a device discovery request packet. When each device that is within the coverage area receives this request, it synchronizes with the requesting device and transmits a discovery response, containing information about itself, to the requesting device. In the example shown in FIG. 2, when the telephone 114 sends the device discovery request packet, it is received by the television 116 which synchronizes communication with the telephone, to establish a link 115 (shown in FIG. 3) with the telephone and then sends information about itself to the telephone 114. The requesting device records the information it receives in response to a device discovery request in an internal table that contains a list of all of the devices within its coverage range and their capabilities.

In the Bluetooth system, device discovery is a one-way communication. Each device discovers the devices in its own coverage area independently of the other devices. Thus, in the example shown in FIG. 2, some time after (or before) the telephone 114 discovers the television 116, the television 116 discovers the telephone 114 and any other devices that are within its coverage area. Thus, after step 410, the telephone 114 has the television in its local device list and vice-versa. As described above, device capability exchange may be a part of the device discovery step, may be performed in a separate step 412 or may be unnecessary, as indicated by alternate path 411, if it is performed as a part of the device discovery step 410 or if the information used from the device capability exchange may be obtained during the control signaling and session description negotiation step 420, described below.

The session discovery step 414 allows each of the devices to obtain descriptions of any sessions in which the devices within its coverage area are participating. This is implemented in step 412 in which each device requests current session information for each of the devices that have registered with it. According to the subject invention, each device maintains a session description, for example, that specified by the session description protocol (SDP). This protocol is an Internet standard and is described in request for comments (RFC) 2327. This standard defines session descriptors that are maintained by the device, describing all of the sessions in which it is currently engaged, either as an endpoint or as a transfer node in a multi-hop link. Although the present invention is described as using SDP to provide the session description, it is contemplated that other protocols may be used to maintain session-specific information in a session descriptor. The exemplary embodiment of the invention implements session discovery by causing the two communicating devices to exchange their session descriptors.

Figure 4:
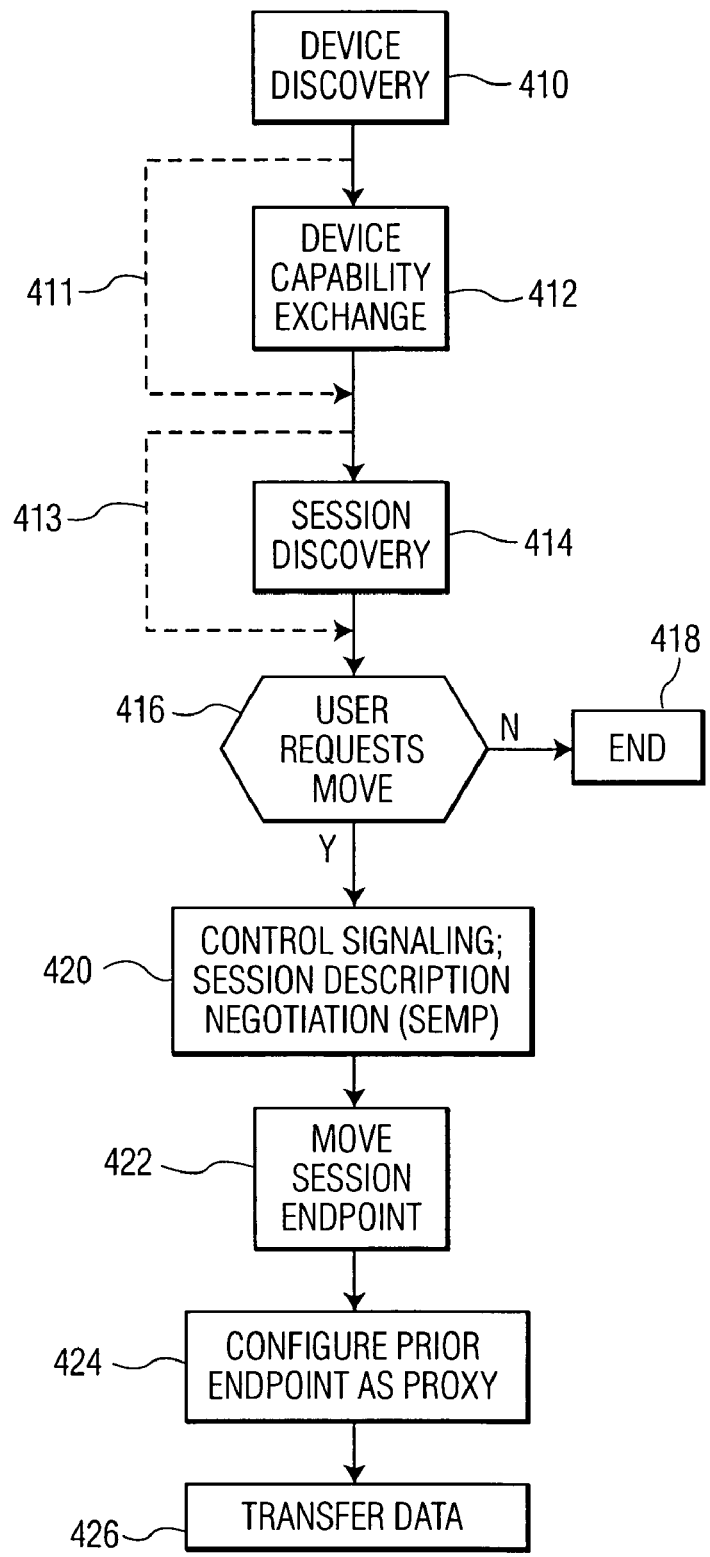
FIG. 4 is a flow-chart diagram that is useful for describing the operation of the subject invention.

As shown by the phantom connector 413 in FIG. 4, however, the session discovery step 414 is optional. As with the device capability information, the session description may be obtained in the control signaling and session description negotiation step, 420, described below.

After step 414 or steps 412 or 410 if respective the session discovery step 414 and/or device capability exchange step 412 is skipped, step 416 is executed in which the user requests extension of the session. As described below, this extension may be requested reactively from the mobile node 114, or proactively from the mobile node 114, the local node 116 or from another node (not shown) that is not otherwise involved with the transaction. After step 416, if the user does not request the extension, the operation ends at step 418. Although the subject invention describes a user requesting a session extension, it is contemplated that a software agent of the user may make this request automatically.

If, at step 416, the user does request extension of the session endpoint, control transfers to step 420 in which control signaling occurs between the mobile node 114 and the local node 116. This step establishes a connection between the mobile node 114 and the local node 116 and then exchanges session descriptions. The control signalling and session description negotiation is the session endpoint management protocol (SEMP) described below. Control signaling occurs when the connection is established and the session negotiation occurs when the session descriptions are exchanged. After the mobile node receives the session description, it configures itself to receive and appropriately process the data provided by the mobile node. If, for example, the data packets being transmitted represent an MPEG-2 data stream, the television 116 may configure itself to direct the received packets to an MPEG-2 transport decoder.

After step 420, the process shown in FIG. 4 executes step 422, which extends or moves the endpoint from the mobile node 114 to the local node 116. Immediately after extending the endpoint, the mobile node 114, at step 424, configures itself as a proxy for the local node so that, at step 426, it passes on data packets received from the correspondent node 100 to the local node, but otherwise appears to the correspondent node as the session endpoint.

It is noted that the endpoint MOVE operation, described above, is not a transfer of the endpoint but the definition of a secondary endpoint by the primary endpoint. With reference to the example shown in FIG. 3, the correspondent node 100 continues to see the telephone 114 as the endpoint. After establishing the television 116 as the secondary endpoint, telephone 114 acts as a proxy for the television, sending all data that it receives from the correspondent node 100 to the television 116 via the synchronized connection 113.

As described above, the endpoint MOVE operation may be initiated reactively or proactively. An example of a reactive extension may be when the user enters a room while watching the video content on the mobile telephone 114. Upon seeing the television, the user reactively commands the telephone 114 to extend the session endpoint to the television. This may be done, for example, by pressing a button on the telephone keypad or a touch sensitive area on the telephone display. This reactive step corresponds to step 416 of FIG. 4.

An example of a proactive initiation of the endpoint extension may be given as described below. If, after exchanging session descriptions at step 414, the television 116 discovers that the telephone 114 is engaged in a session that is displaying video data, the television 116 may proactively display a message to the user asking whether the session should be moved from the telephone to the television. The user's response to this prompt is the result of step 416, described above. Instead of the television proactively displaying the menu, the menu may be displayed in response to the command from the user to transfer the session. This allows the user to confirm the command.

A device in the ad-hoc network that is neither the telephone 114 nor the television 116 may also initiate the endpoint MOVE operation. If, for example, the user has a personal digital assistant (PDA) (not shown) that is configured as a node in the ad-hoc network, the PDA could be used to directly cause the telephone 114 and television 116 to extend the endpoint of the session or to query the user as to whether the session should be extended from the telephone 114 to the television 116. If the user decides to extend the session, the PDA may initiate the control signaling and session description negotiation of step 420, described above.

Figure 5:
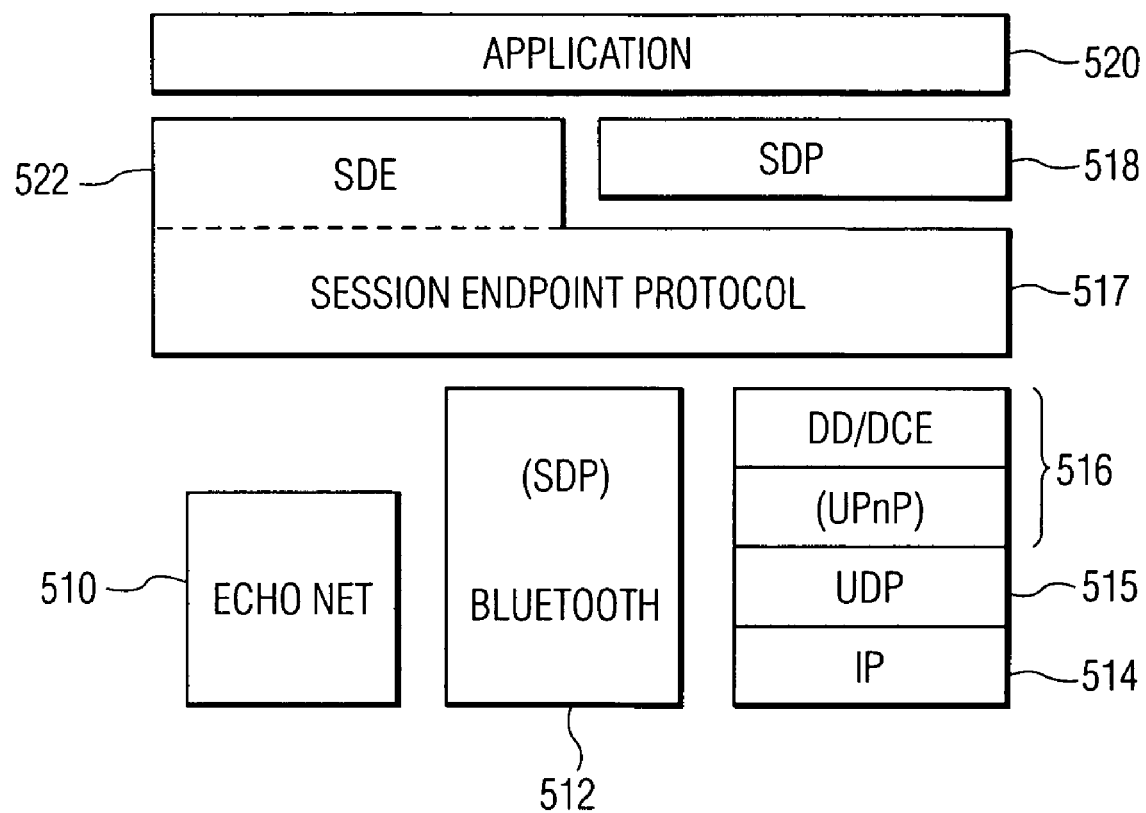
FIG. 5 is a data structure diagram that is useful for describing possible configurations of a protocol stack suitable for use with the present invention.

As described above, a protocol embodying the present invention may be implemented as a part of the application layer defined according to the OSI network model. FIG. 5 shows an exemplary protocol stack that illustrates how the present protocol may be implemented in an Echo Net™ network 510, a Bluetooth network 512 or an IP network 514. Both Echo Net and Bluetooth have defined transport protocols and are not shown in FIG. 5. The exemplary IP network uses the User Datagram Protocol (UDP) 515 as its transport protocol. UDP is an Internet standard and is described in RFC 768. In the IP network, the transport layer may also include a device discovery or device capability exchange (DD/DCE) protocol 516 that may be used to implement universal plug and play (UPnP).

A session endpoint management protocol 517 according to the subject invention is above any of these transport protocols in the stack, as software within the application layer of the device. The application layer may also include a session description exchange (SDE) protocol 522, as described above and/or a session description protocol (SDP) 518. Other applications 520 exist in the application layer above the programs of the present invention in the protocol stack. Although not shown, it is contemplated that the software which implements the session endpoint management protocol may include appropriate application program interfaces (API's) to allow the other programs 520 in the application layer to access the features of the session endpoint management software. As an alternative to implementing the session endpoint management process in the application layer of the OSI model, it is contemplated that this software may be implemented in the session layer, when the session layer is distinguished from the application layer.

The subject invention may also be used when the "session" that is being extended is entirely within the endpoint node 114. This may occur, for example, in a device having a processor and a transducer, in which data is sent from a processor to the transducer. The sending of data from the processor to the transducer may be considered to be a logical session, even though no formal session exists. Using this model, the processor may be considered to be a logical correspondent node and the transducer may be considered to be a logical endpoint. If, for example, the node 114 shown in FIG. 2 were a portable video game having wireless capabilities, it may be considered to be a self-contained logical session which includes both the logical correspondent node (i.e. the processor that executes the video game software) and the logical endpoint (i.e. the video game display). A user, on entering a room may want to display the video game on the television 116 while continuing to use the video game keypad to play the game. According to the present invention, the node 114 could move its endpoint to transfer data packets to the television so that the game could be displayed on the television instead of on the video game display. Even though no actual session exists, the mobile node 114 may still generate a session description and transfer it to the local node 116 and then begin to transfer the session data to the local node 116 for processing, as described above.

In one exemplary embodiment of the invention, every device within the ad hoc network may initiate an operation according to the session endpoint management protocol (SEMP). The initiator may or may not be associated with that local session. Six operations are defined in the exemplary SEMP protocol: MOVE, COPY, SPLIT, MERGE, INCOMING SESSION and OUTGOING SESSION.

The MOVE operation may be used to change the endpoint device. This operation is the endpoint extension operation, described above, and enables a user to select the most suitable device in his/her environment on which to continue the session.

The COPY operation may be used when the user wants to use multiple endpoint devices for one session. This operation enables another person or device to join the existing session. In the example presented above, a COPY operation allows the user to continue to view the video program on the telephone 114 while it is also displayed on the television 116.

The SPLIT operation may be used to separate one existing session endpoint to more than two devices. In this operation single session is divided to two split sessions. Although this operation moves the session endpoint to other multiple devices, it allows one of the spilt sessions to be left on the original device. In the example presented above, if, in addition to the television 116, there were an audio system (not shown) within the coverage range of the mobile telephone 114, the telephone 114 may split the session such that the television 116 becomes the secondary endpoint for video data while the audio system becomes the secondary endpoint for audio data.

The MERGE operation may be used to merge two split session endpoints on the devices into single endpoint on the single device. MERGE operation is also used to merge two independent session endpoints onto the single device. In the above example, if the session were split such that the television 116 were the secondary endpoint for video data and the audio system were the secondary endpoint for audio data, the MERGE operation may be used to transfer the audio session to the television 116 so that it handles both the audio and video data of the session.

The INCOMING SESSION operation may be used, by a device not connected to another network (e.g. the IP network 102), to pick up a session (e.g. a telephone call) that is transmitted over the IP network. Because the device is not connected to the network 102, it can not receive the call directly. In the exemplary embodiment, incoming calls from the network 102 may be announced to every device within the coverage area of a device, such as the mobile telephone 114, which may be connected to the network 102 but also may communicate with other devices via the ad-hoc network.

The OUTGOING SESSION operation may be used, by a device to initiate a session (e.g. a telephone call) over a network (e.g. the IP network 102) to which the device is not directly connected. Any device in the ad-hoc network may initiate an OUTGOING SESSION operation by connecting, through the ad-hoc network, to a device that is directly connected to the network.

Before providing a detailed description of each of these operations, it is useful to describe the overall format of the SEMP protocol. A SEMP message may be either a request from a client to a server, or a response from a server to a client. The SEMP message format is similar to that of SIP, referenced above. Both types of messages include a start-line, one or more header fields, an empty line indicating the end of the header fields, and an optional message-body. This message structure is illustrated in Table 1.

TABLE 1

```
generic-message = start-line
                  *message-header
                  CRLF
                  *[ message-body ]
start-line      = Request-Line | Status-Line
```

In this example, the start-line, each message-header line, and the empty line are terminated by a carriage-return line-feed sequence (CRLF). Note that when there is no message body, an empty line (i.e. a CRLF) is transmitted.

Requests in the exemplary session endpoint management protocol are distinguished by having a Request-Line for a start-line. A Request-Line contains a method name, a Request-Endpoint-ID, and the protocol version separated by a single space (SP) character.

The Request-Line ends with CRLF. In the exemplary protocol, no CR or LF is allowed except in the end-of-line CRLF sequence. No linear white space (LWS) is allowed in any of the elements. The format of the Request-Line is shown in Table 2.

TABLE 2

Request-Line = Method SP Request-Endpoint-ID SP SEMP-Version CRLF
Method: seven methods are defined for the exemplary SEMP: 1) INFO for exchanging information, 2) MOVE, 3) COPY, 4) SPLIT, 5) MERGE 6) CONNECT for operating session endpoint and 7) TERMINATE for terminating local sessions.
Request-Endpoint-ID: The Request-Endpoint-ID field is an endpoint device identifier. This identifier indicates the device to which this request is being addressed. In the exemplary embodiment, the IP address of the device is used as Request-Endpoint-ID.
SEMP-Version: Both request and response messages include the version of SEMP, which indicates compliance requirements. To be compliant with this specification, SEMP messages between two devices desirably include compatible versions of SEMP, e.g. "SEMP/1.0".

SEMP responses are distinguished from requests by having a Status-Line as their start-line. A Status-Line consists of the protocol version followed by a numeric Status-Code and its associated textual phrase, with each element separated by a single SP character. No CR or LF is allowed except in the final CRLF sequence. The structure of the SEMP response is shown in Table 3.

TABLE 3

Status-Line = SEMP-Version SP Status-Code SP Reason-Phrase CRLF
Status-Code: The Status-Code is a 3-digit integer result code that indicates the outcome of an attempt to understand and satisfy a request.
Reason-Phrase: The Reason-Phrase is intended to give a short textual description of the Status-Code.

The Status-Code is intended for use by automata, whereas the Reason-Phrase is intended for the human user. A client is not required to examine or display the Reason-Phrase.

The first digit of the Status-Code defines the class of response. The last two digits do not have any categorization role. For this reason, any response with a status code between 200 and 299 is referred to as a "2xx response", any response with a status code between 400 and 499 as a "4xx response", and so on. SEMP/1.0 allows three values for the first digit as shown in Table 4.

TABLE 4

2xx: Success -- the action was successfully received, understood, and accepted;
4xx: Client Error -- the request contains bad syntax or cannot be fulfilled at this server;
5xx: Server Error -- the server failed to fulfill an apparently valid request;

The exemplary SEMP header fields are similar to SIP header fields both in syntax and semantics. SEMP also specifies that multiple header fields having the same field name and values in a comma-separated list can be combined into one header field. Specifically, any SEMP header having a grammar in the form shown in Table 5 allow for combining header fields of the same name into a comma-separated list.

TABLE 5 header = "header-name"
HCOLON header-value *(COMMA header-value)

The exemplary header fields follow the same generic header format as that given in Section 2.2 of RFC 2822, describing SIP. Each header field consists of a field name followed by a colon (":") and the field value.

The formal grammar for a message-header allows for an arbitrary number of space characters on either side of the colon; however, implementations desirably avoid spaces between the field name and the colon and use a single space character (SP) between the colon and the field-value. Examples of acceptable syntax are shown in Table 6.

TABLE 6

| Content-Length: | 1024 |
|---|---|
| Content-Length: | 1024 |
| Content-Length: | 1024 |
| Content-Length: | 1024 |

While all of the formats shown in Table 6 are valid and equivalent, the last entry is the preferred form.

The relative order of header fields with different field names is not significant. Multiple header Implementations are desirably able to process multiple header field rows with the same name in any combination of the single-value-per-line or comma-separated value formats.

In the exemplary protocol, the format of a header field-value is defined for header-name. It may be either an opaque sequence of TEXT-UTF8 octets, or a combination of white space, tokens, separators, and quoted strings. Many existing header fields adhere to the general form of a value followed by a semi-colon separated sequence of parameter-name, parameter-value pairs, as shown in Table 7.

TABLE 7 field-name: field-value *(;parameter-name=parameter-value)

In the exemplary embodiment, even though an arbitrary number of parameter pairs may be attached to a header field value, any given parameter-name desirably appears only once.

The exemplary SEMP also provides a mechanism to represent common header field names in an abbreviated form. This may be useful when messages would otherwise become too large to be carried on the transport available to it. These compact forms are described below. A compact form may be substituted for the longer form of a header field name at any time without changing the semantics of the message. In the exemplary embodiment, a header field name may appear in both long and short forms within the same message.

All SEMP messages, either requests or responses, may contain message bodies. The exemplary SEMP allows a message to contain multiple bodies, if the Content-Number header field indicates that multiple bodies are present.

In the exemplary embodiment, the Content-type header field indicates the Internet media type of the message body. If the body has undergone any encoding such as compression, it is indicated by the Content-Encoding header field; otherwise, Content-Encoding is omitted. If applicable, the character set of the message body is indicated as part of the Content-Type header-field value.

SEMP messages may contain binary bodies or types of bodies. When the sender does not explicitly specify a charset parameter, media subtypes of the "text" type are defined to have a default charset value of "UTF-8".

The Content-Length header field specifies the body length in bytes. The contents of this header field for the exemplary SEMP are described below.

The Content-Number header field is used to indicate that the message has multiple bodies. If the message has only one body, this header field may be omitted.

As described above, with reference to Table 2, SEMP defines several "methods" to manage the session endpoint. These methods conform to operations performed using the protocol and are used in the SEMP request line and indicate an action to be taken in response to a SEMP Request. In description of the exemplary embodiment provided below, SEMP messages are referred to by their method names (i.e. INFO, MOVE, COPY, SPLIT, MERGE CONNECT and TERMINATE).

The SEMP_INFO message is used to exchange information. Information that may be exchanged includes, session description, primary endpoint context and session context. In the exemplary embodiment, this message includes both Info-Type and Info-State header fields. The Info-Type field indicates the information such as session description, primary endpoint context and session context carried by this message. The Info-State field value may be either "Inquire" or "Indicate." In the Inquire state, a node requests information from another node and receives a response message with the requested information as a reply. In the Indicate state, a node provides information to another node and may receive, in a Response message, an indication that another node will or will not be supported. This message may not be necessary if alternative protocols are available in the system.

The SEMP_MOVE message is used to move the session endpoint to another node. This operation is described in detail above. In the exemplary embodiment, this message includes the From and To header fields which specify the source and destination nodes for the MOVE operation. Either the source or destination node may initiate this message, but other nodes in the ad-hoc network may also initiate the message.

The SEMP_COPY message is used to make a copy of the session on another node. This exemplary message includes the From and To header fields which specify the current session endpoint and a secondary endpoint node to which the session is to be copied. Either node involved in this COPY operation may initiate this message as well as other nodes in the ad-hoc network.

The SEMP_SPLIT message is used to separate single existing session endpoint to two or more devices. This exemplary message includes the From and To header fields. Any node may initiate this message.

The SEMP_MERGE message is used to merge two split sessions on two devices into a single session on a single device. In the exemplary embodiment, this message includes the From and To header fields. Any node in the ad-hoc network may initiate this message.

The SEMP_CONNECT message is used to notify a node in the ad-hoc of an incoming call or to let another node make an outgoing call.

SEMP_TERMINATE message is used to terminate the ad hoc local session between devices and release resources assigned to single or split sessions. This message may be used to terminate the primary endpoint and the session associated with the primary endpoint. In the exemplary embodiment, this message includes a Terminate-Target header field. Any node in the ad-hoc network may initiate this message.

The header fields used in the exemplary SEMP protocol and their compact forms are described below in Table 8.

TABLE 8

Info-Type

The Info-Type header field identifies the purpose of SEMP_INFO message, because it is used for session description exchange, primary endpoint context exchange and session context Transfer.

Info-State

The Info-State header field shows the state of the SEMP_INFO message. This field may have values of "Inquire" or "Indicate."

Session-ID

The Session-ID header field uniquely identifies a particular session. The first primary endpoint assigns this identifier for any SEMP operation. The compact form of the Session-ID header field is i.

Primary-Endpoint

The Primary-Endpoint header field holds the address of the PE. The compact form of the Primary-Endpoint header field is p.

Previous-Node

The Previous-Node header field shows the address of the Previous Node, that is to say, the node that performs the application level forwarding of the data. This field may be used for route optimization, as described below.

From

The From header field holds the address of node that sent the SEMP message. The compact form of the From header field is f.

To

The To header field holds the destination address of the SEMP message. This value identifies the node that receives the message. The compact form of the To header field is t.

TABLE 8-continued

Terminate-Target

The Terminate-Target header field holds the address of the node that is to have its session terminated.

Content-Length

The Content-Length header field indicates the size of the message-body. The size is sent to the recipient as a decimal number of octets. Applications desirably use this field to indicate the size of the message-body to be transferred, regardless of the media type of the entity. In the exemplary embodiment, the size of the message-body does not include the CRLF separating the header fields from the message body. Any Content-Length greater than or equal to zero is a valid value for this field. If no body is present in a message, then the Content-Length header field has a value of zero. If multiple bodies are present in a message, then the Content-Length header field values are in the same order as the bodies. The compact form of the header field is l.

Content-Type

The Content-Type header field indicates the media type of the message-body sent to the recipient. The Content-Type header field is present whenever the message has a body. The compact form of the header field is c.

Content-Number

The Content-Number header field indicates the number of the message-bodies included in the message sent to the recipient. Applications desirably use this field to indicate the number of the message-bodies to be transferred. The Content-Number header field is present if the message contains more than one message body. There is no separator between bodies. The Content-Length header field is available for the separation. The compact form of the header field is n.

A node that is known as an endpoint by the correspondent node is called the primary endpoint. The primary endpoint never changes while a session is active. It is necessary to establish new session in order to change the primary endpoint to another device and the session establishment protocol like SIP may be used to establish the new session. In the primary endpoint changing process the new device, which will be next primary endpoint, has to exchange the primary endpoint context (PEC) with the primary endpoint. Most of SEMP messages include the primary endpoint address. Therefore every node involved in this session can communicate to the primary endpoint.

The PEC is information that describes the session state within the ad hoc network. The exemplary SEMP does not define the contents of the PEC. The primary endpoint has a PEC and it is sent to any new primary endpoint when a new session is established to change the primary endpoint.

The PEC is desirably exchanged before any node in the ad hoc network tries to establish a new session with the correspondent node. Although the use of the PEC is not confined to SEMP, the SEMP_INFO message may be used to carry the PEC.

The exemplary SEMP manages logical operations of each endpoint. It does not, however, influence the routing of messages among the devices in the ad-hoc network. After a MOVE operation, for example, the application layer forwards any data that the primary endpoint receives to the secondary endpoint. To handle this forwarding, it may be desirable to have routers between the primary and secondary endpoints. Logically, however, the secondary endpoint directly connects to the primary endpoint. Because it is concerned only with this logical connection, the exemplary SEMP operates even when the ad-hoc network includes a route optimization mechanism.

Figures 6A, 6B, 6C, 6D, 6E, 6F, 6G, 6H:
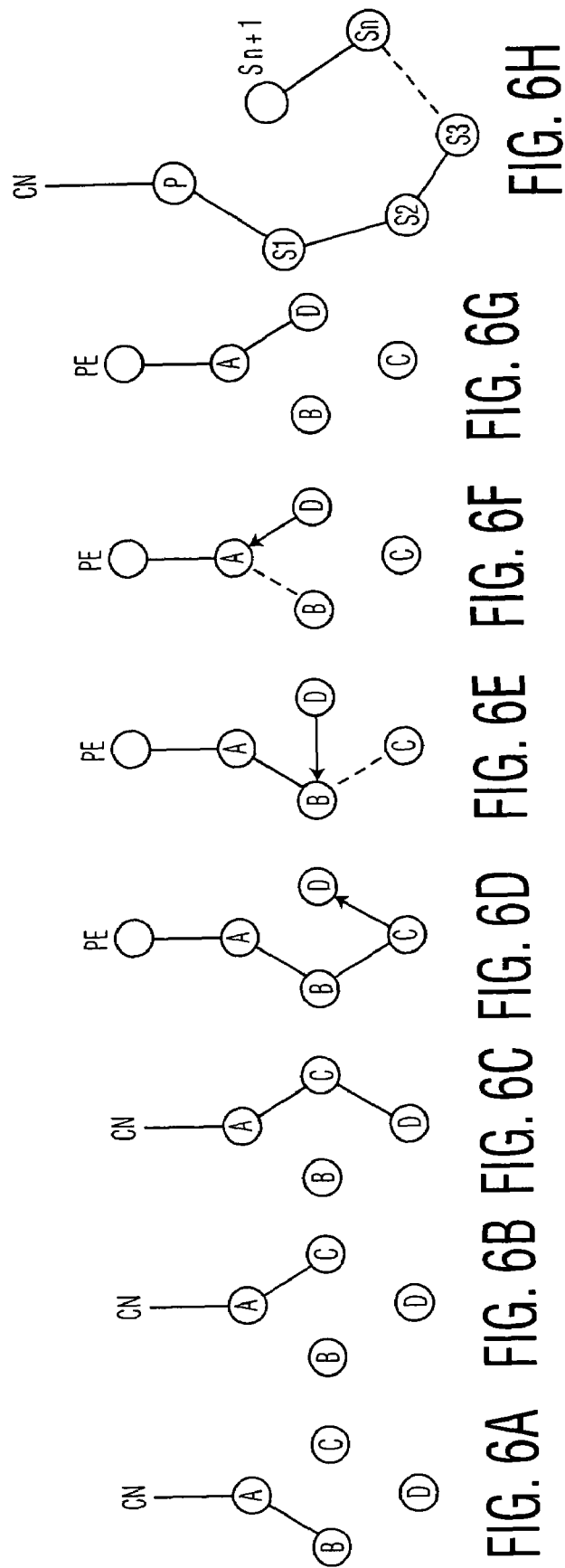
FIGS. 6A, 6B, 6C, 6D, 6E, 6F, 6G and 6H are network node diagrams that are useful for describing route optimization.

FIGS. 6A through 6H show two examples of route optimization according to the present invention. FIGS. 6A through 6G show four devices, A, B, C and D, within the ad hoc network. Device A is a primary endpoint (PE) in this example. In FIG. 6A, a MOVE operation according to the exemplary SEMP has been performed to move the session endpoint by defining device B as a secondary endpoint (SE). The local session between the device A and B is established and the device A simply transfers the session data to the device B at the application layer. It is noted that device A, the predecessor node to node B in the ad-hoc network, does not operate as a router. In FIG. 6B, starting with the configuration shown in FIG. 6A, the device B attempts to move the session endpoint to device C. Although the message is sent to the device C from device B, device C, which includes routing functionality, knows that it can directly access the session from device A. In this example rather than responding to the MOVE message from device B, device C, reads the PREVIOUS NODE field from the message, identifies node A as being a node within its coverage area and sends a MOVE message to node A, requesting that node A move the session to node C instead of to node B. Consequently, the local session is established not between devices B and C, but between devices A and C due to the route optimization mechanism. In FIG. 6C, from the configuration shown in FIG. 6B, device C attempts to move the local session to the device D. It is useful to consider two scenarios for performing this operation. If either device B or device C can act as a router, device D can logically establish the local session to the device A. If neither of the devices B and C can act as a router, the session is moved from device C to device D with device C, the predecessor node to device D, performing application level forwarding of the session data to device D.

Another route optimization example is shown in FIGS. 6D through 6G. These Figures show four nodes within a personal area network (PAN). In FIG. 6D, the PE, node A and node B do application forwarding to a next node respectively. In FIG. 6D, node C tries to move the local session to the node D. As shown in FIGS. 6D through 6G, node D is located within the coverage area of nodes A, B and C. The SEMP MOVE message from node C includes information about its predecessor node, node B, in its PREVIOUS NODE field. Consequently, when node D receives the MOVE message, it knows that it is within the coverage area of node B and that route optimization is available. Using this information, node D, as shown in FIG. 6E, sends a MOVE message to the node B requesting B to move its session to node D. Node B replies an acknowledge (ACK) message including the identity of its predecessor node (i.e. node A). When node D receives the ACK, it knows that it is within the coverage area of node A and that more route optimization is available. Thus, as shown in FIG. 6F, node D sends a MOVE message to the node A. Finally, as shown in FIG. 6G, the local session is established between the node A and D and route optimization has been done.

FIG. 6H illustrates an extension of the exemplary SEMP described above that further facilitates route optimization. This figure shows an ad hoc network created by using the exemplary SEMP MOVE operation. The node P is the primary endpoint that has a connection to the correspondent node, CN. Nodes S1, S2, S3, . . . , SN are respective secondary endpoints created using the SEMP MOVE operation. In the example shown in FIG. 6H, there are n+1 secondary endpoints and thus, n+1 nodes in the sequence of nodes that define the ad-hoc network. Node Sn+1, the final node in the sequence, is the actual endpoint of this session.

As described above, node Sn can know only primary endpoint (from the PRIMARY ENDPOINT field) and node Sn−1 (from the PREVIOUS NODE field), and can send this information to the node Sn+1 with the MOVE message. Therefore even if one of the other nodes in the sequence of nodes between node P and node Sn−2, for example, node S1, is within the coverage area of node Sn+1, node Sn+1 can not initiate a MOVE operation because it does not have any information about the other nodes.

This may be resolved with an extension of the exemplary SEMP protocol. According to this extension, whenever a MOVE operation is requested, the node that will be the new final node in the sequence issues a backward query packet (e.g. a SEMP_ROUTE_OPT packet) to the sequence of nodes that defines the ad hoc network generated by repeated MOVE operations. In this example node Sn+1 sends the SEMP_ROUTE_OPT message to the node Sn. After Sn receives the packet, Sn forwards it to the node Sn−1. Finally the backward query packet comes to the primary endpoint. The backward query packet contains node information, such as the media access (MAC) layer address. This information enables the node to optimize the route. For example, if nodes S1 and S3—but not node S2—are within the coverage area of node Sn+1. When the node S3 receives the SEMP_ROUTE_OPT message, it shuts down the path from to Sn+1 through Sn and at the same time it sends the SEMP MOVE message to the Sn+1 directly. The more efficient path was established. As a result of this new MOVE operation, node Sn+1 issues a SEMP_ROUTE_OPT message. Because node S3 is in direct communication with node Sn+1 at this time, the SEMP_ROUTE_OPT packet is sent through nodes S3 and S2 to node S1. When node S1 receives the SEMP_ROUTE_OPT message, it shuts down the path from node Sn+1 to node S3, and at the same time it sends a SEMP MOVE message to node Sn+1 directly. Thus, the most efficient path is established.

The exemplary session endpoint management protocol can handle many kinds of sessions and is "session agnostic." Some sessions, however, use historical data of the session. This historical data is referred to herein as session context. Suppose, for example, that the session is a file transfer protocol (ftp) session for downloading a file. If the MOVE operation is applied in the middle of the downloading process, the first half of the downloaded file remains in the previous device and only last half of the file comes to new device. In this example the file is the session context and for the session MOVE operation to be meaningful, it is desirable for the first half of the file to be sent to the new device by a session context transfer protocol. While the exemplary SEMP does not include a session context transfer protocol, it is contemplated that one or more SEMP_INFO messages may be used to transfer the session context.

FIGS. 7, 8, 9, 10, 11 and 12 illustrate examples of the message exchange transaction in each SEMP operation. To simplify the description, it is assumed that every request message receives a positive response.

Move

Figure 7A:
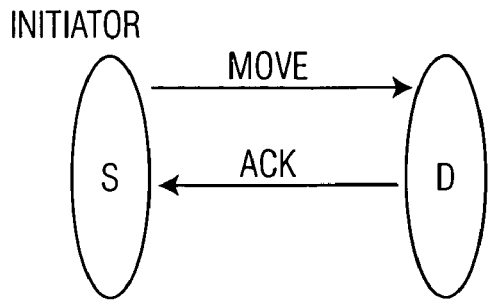
FIGS. 7A, 7B, 7C and 7D are network node diagrams that are useful for describing a MOVE operation according to the present protocol.
Figure 7B:
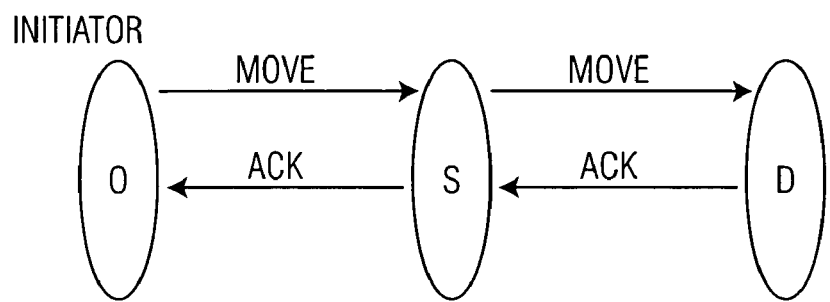
Figure 7C:
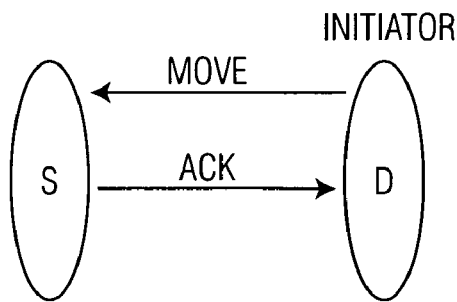
Figure 7D:
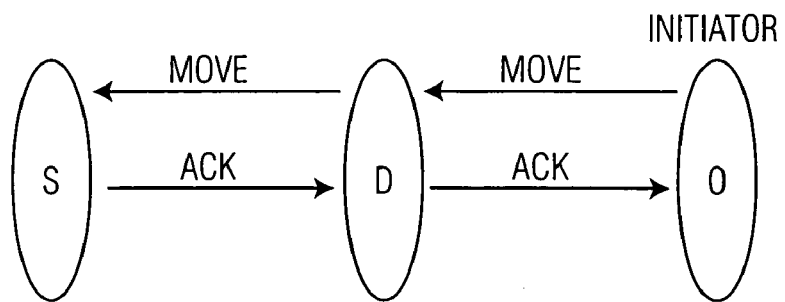

FIGS. 7A through 7D show examples of SEMP MOVE operations. In these Figures node S is the source node and node D is the destination node. Therefore the session endpoint moves or is extended from node S to node D. Node O is a node within the ad hoc network that is not involved in this actual operation (i.e. is neither the source nor the destination). Node O, however, can send the message that initiates the operation. In FIG. 7A node S initiates the MOVE operation. As shown in FIG. 7A, node S sends a MOVE message to node D and node D replies with a response message (i.e. an ACK message). In FIG. 7B, node O is the initiator, requesting node S to extend its session to node D. Node 0 first sends the MOVE message to node S. Next, node S sends the MOVE message to D. Node D responds to node S with an ACK message and then node S responds to node O with an ACK message. FIG. 7C illustrates the scenario in which node D is the initiator and FIG. 7D illustrates the scenario in which node O is the initiator but sends the MOVE message to node D instead of to node S.

Copy

Figure 8A:
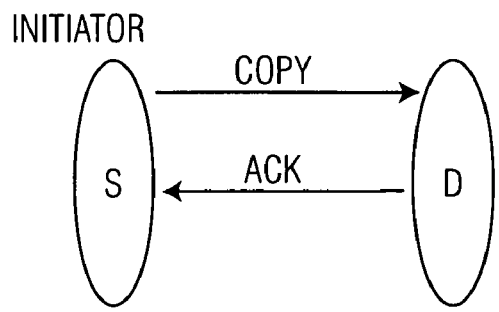
FIGS. 8A, 8B, 8C and 8D are network node diagrams that are useful for describing a COPY operation according to the present protocol.
Figure 8B:
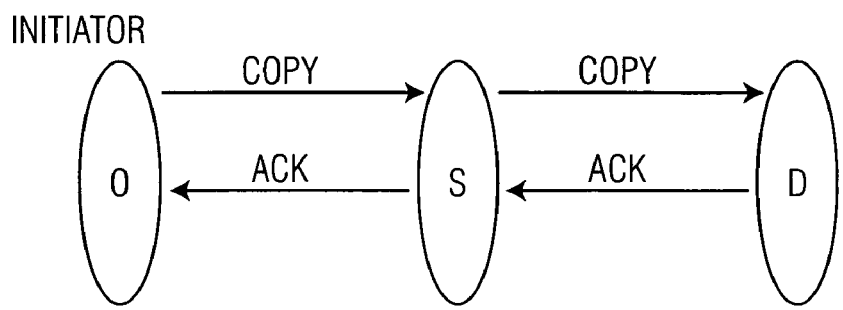
Figure 8C:
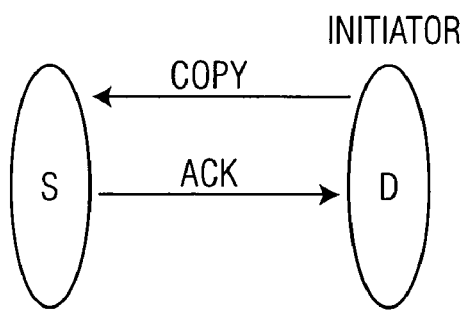
Figure 8D:
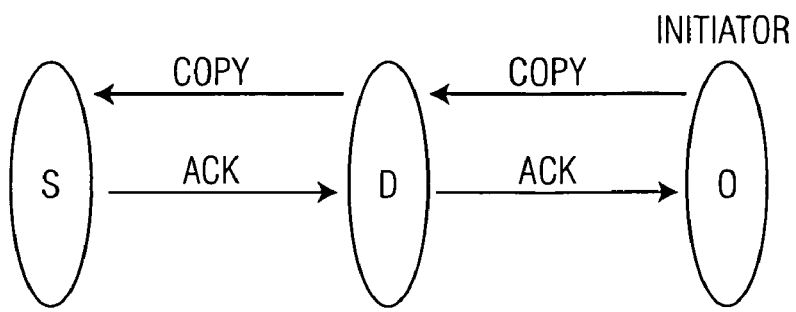

FIGS. 8A through 8D show examples of the SEMP COPY operation according to the present invention. In these Figures node S is the source node of the COPY operation and node D is the destination node. Therefore, the session endpoint is copied from node S to node D. When the COPY operation is complete, both nodes S and D are session endpoints. Node S is the primary endpoint (or a secondary endpoint from a previous SEMP operation) and node D is a secondary endpoint, mirroring the session processing at node S. Node O is a node within the ad hoc network that is not involved in this actual operation. It can, however, send the message that initiates the operation. In FIG. 8A, node S initiates the COPY operation. In this example, node S sends node D a COPY message and node D replies an ACK response message. In FIG. 8B, node O is the initiator and it sends the message to node S first. After node S receives the COPY message, it sends the message to node D. Node D responds with an ACK message and then node S responds to Node O with an ACK message. In FIG. 8C, node D is the initiator. In FIG. 8D node O is once again the initiator but it sends the message to node D so that node D can request the COPY operation from node S.

Split

FIGS. 9A through 9J show examples of the SEMP SPLIT operation according to the present invention. In this figure node S is the source node of this SPLIT operation and nodes D1 and D2 are destinations of this operation respectively. For example, node S may be the mobile telephone 114, shown in FIG. 3, node D1 may be the television 116 and node D2 may be an audio system (not shown). In the example shown in FIG. 9A, the session endpoint is split from node S to nodes D1 and D2. In the context of the example shown in FIG. 3, in the SPLIT operation, the video portion of the session that was being displayed on the screen of the telephone 114 is transferred to the television 116 while the audio portion of the session is transferred to the audio system. In the examples shown in FIGS. 9B, 9D, 9F, 9H and 9J, node O is a node within the ad hoc network that is not involved in this actual operation but that can send the SPLIT message that initiates the operation.

Figures 9A, 9B, 9C:
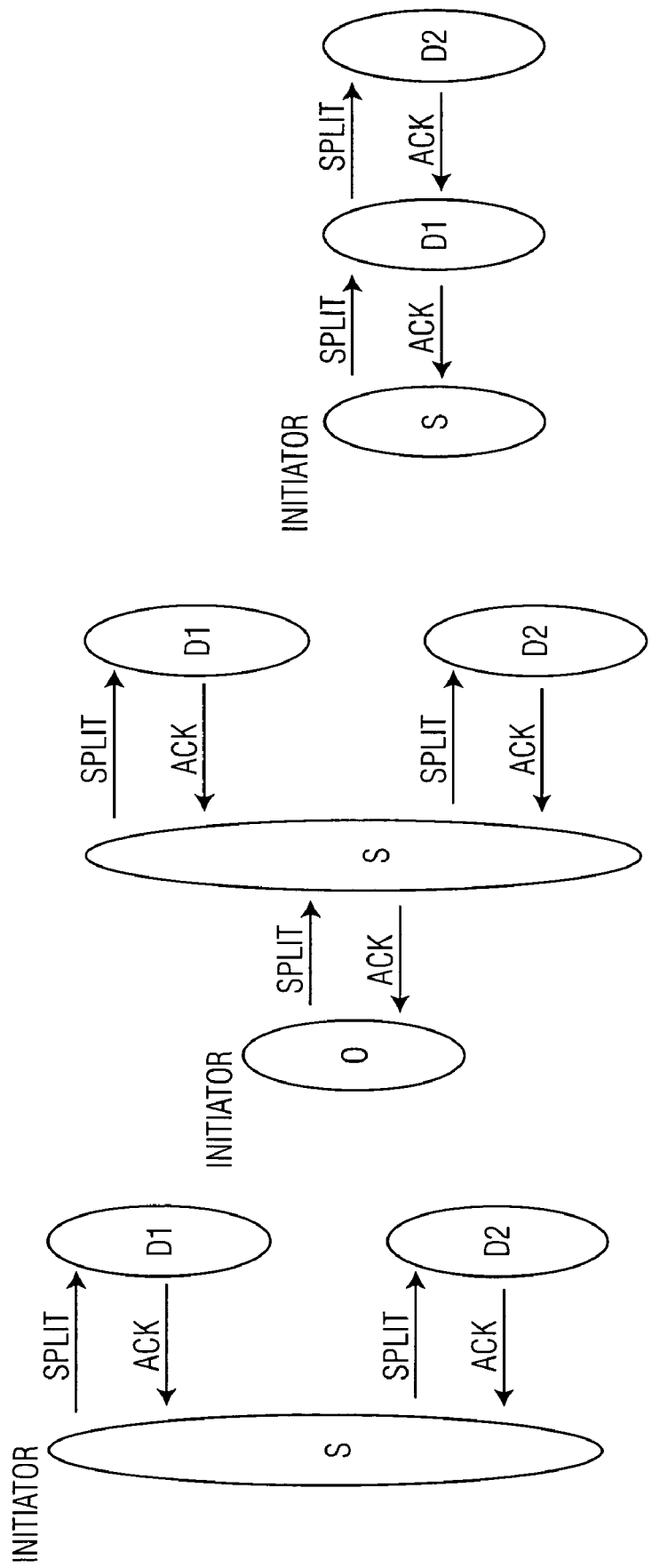
FIGS. 9A, 9B, 9C, 9D, 9E, 9F, 9G, 9H, 9I and 9J are network node diagrams that are useful for describing a SPLIT operation according to the present protocol.
Figure 9D:
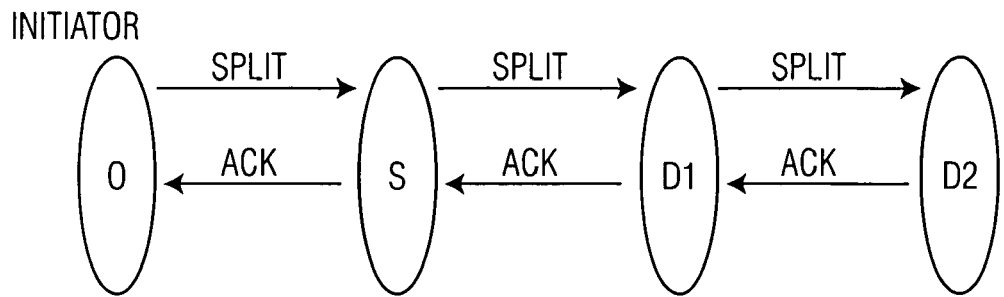

In FIG. 9A, node S is the initiator of SPLIT operation. Node S sends respective SPLIT messages to nodes D1 and D2. In the example shown in FIG. 9A, nodes D1 and D2 reply with ACK response messages. FIG. 9B represents the same operation shown in FIG. 9A except that node O is the initiator and it sends the SPLIT message to node S first. This message indicates that the session endpoint S is to split its session between nodes D1 and D2. After receiving the SPLIT message, node S sends the messages to nodes D1 and D2. Nodes D1 and D2 respond with respective ACK messages to node S and then node S responds with an ACK message to node O. In FIG. 9C, node S is the initiator. Node S sends a SPLIT message to node D1 and then node D1 sends a SPLIT message to node D2. It is also possible for nodes D1 and D2 to be swapped in the configuration shown in FIG. 9C. FIG. 9D represents the same operation as in FIG. 9C except that node O is the initiator. In this example, node O first sends a message to node S and then the operation proceeds as described with reference to FIG. 9C.

Figure 9E:
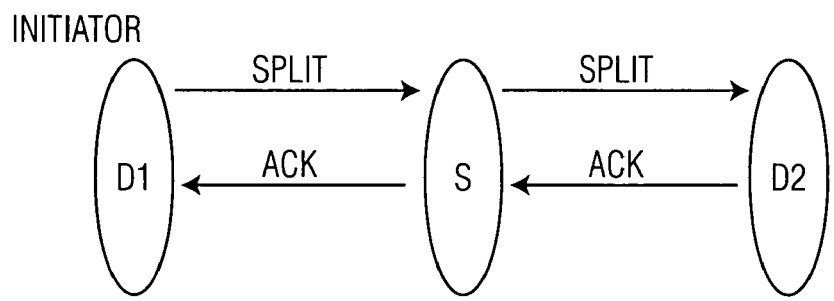
Figure 9F:
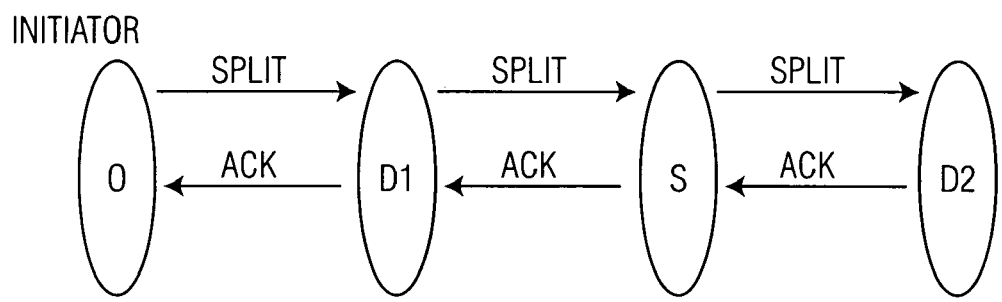
Figure 9G:
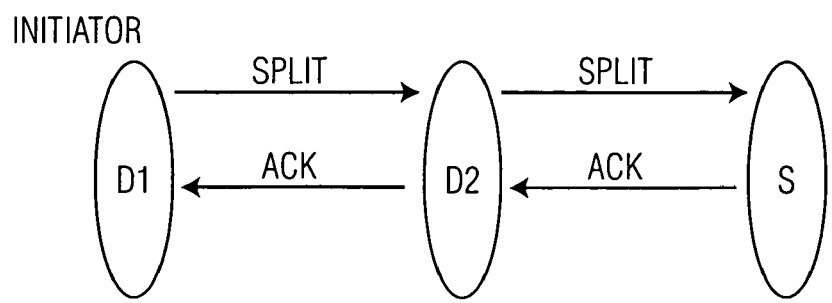
Figure 9H:
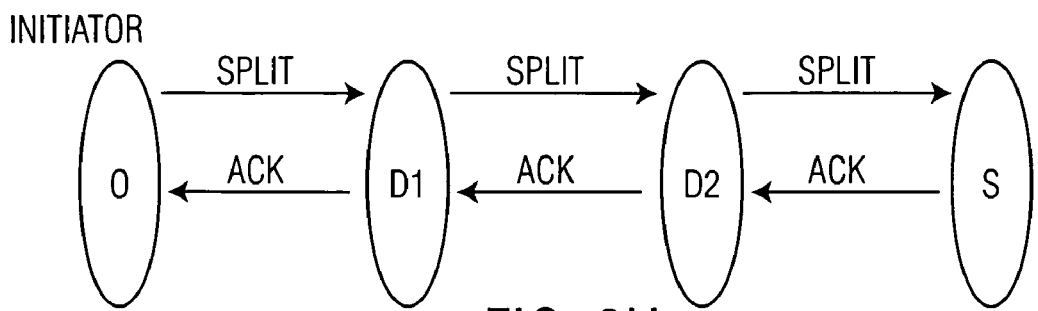
Figure 9I:
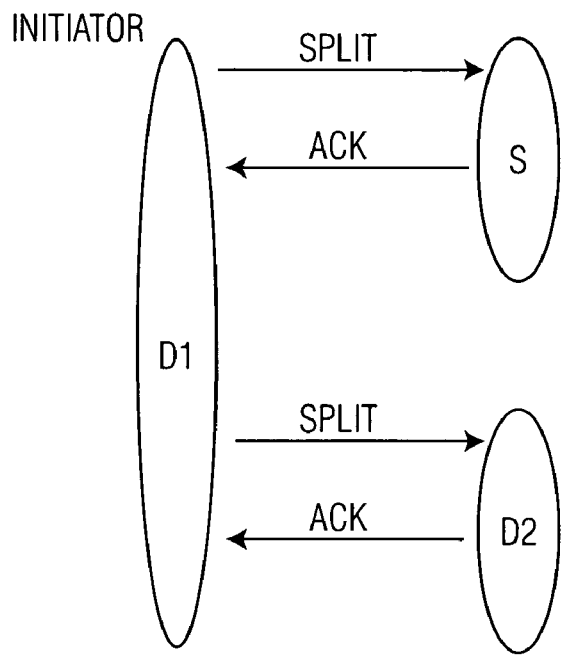
Figure 9J:
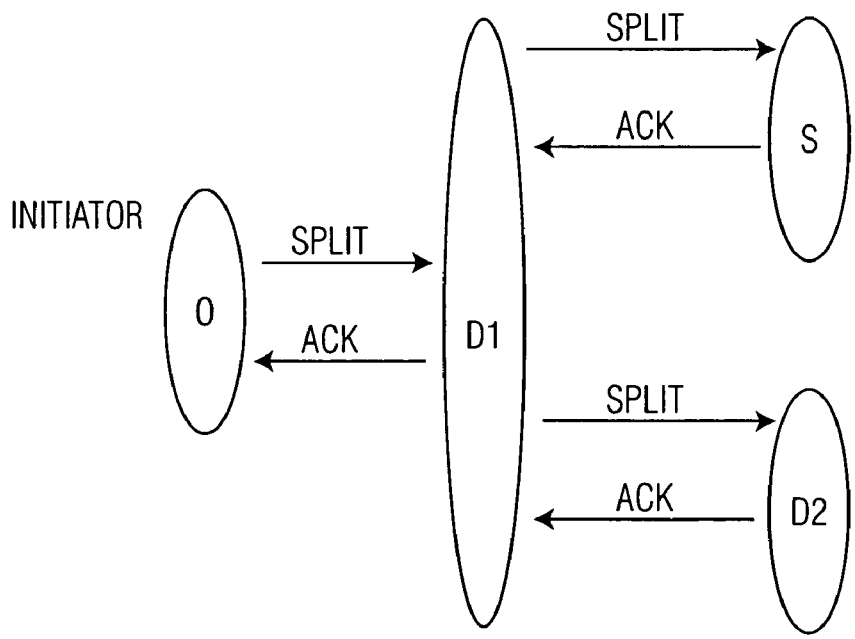

In FIG. 9E, node D1 is the initiator and it sends the SPLIT message to node S first. Next, node S sends the SPLIT message to node D2. Node D2 responds with an ACK message to node S, node S responds with an ACK message to node D1 and then the split session data transfers from node S to nodes D1 and D2 begin. In FIG. 9F, node O is the initiator, otherwise the operation is the same as in FIG. 9E. In FIG. 9G, node D1 is the initiator and it sends the SPLIT message to node D2 first. Node D2 responds by sending a SPLIT message to node S. Node S responds to node D2 with an ACK message and then node D2 responds to node D1 with an ACK message. After this second ACK message, data transfers from node S to nodes D1 and D2 may begin. FIG. 9H is the same as FIG. 9G except that node O is the initiator. In FIG. 9I, node D1 is the initiator of SPLIT operation. Node D1 sends the SPLIT message to nodes S and D2. Nodes S and D2 reply to node D1 with ACK response messages. Although not shown, it is contemplated that nodes D1 and D2 may be swapped in FIG. 9I. FIG. 9J is the same as FIG. 9I except that node O is the initiator.

Merge

FIGS. 10A through 10J show examples of SEMP MERGE operations according to the present invention. The MERGE operation is the inverse of the SPLIT operation; it joins two sessions into a single session. Using the example described above with reference to the SPLIT operation, the MERGE operation may merge an audio session sent to the audio system (not shown) and a video session sent to the television 116 into a single session that is sent to the mobile telephone 114. In this figure nodes S1 and S2 are the source nodes of this MERGE operation and node D is the destination of this operation. Therefore the session endpoints are merged from nodes S1 and S2 to node D. Node O is, again, a node within the ad hoc network that is not involved as a source or destination node in the MERGE operation. Node O, however, can send the message that initiates the MERGE operation.

Figure 10A:
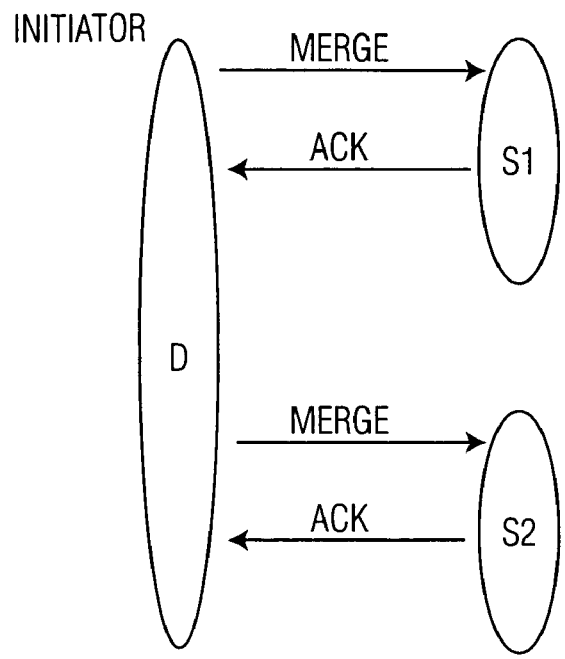
FIGS. 10A, 10B, 10C, 10D, 10E, 10F, 10G, 10H, 10I and 10J are network node diagrams that are useful for describing a MERGE operation according to the present protocol.
Figure 10B:
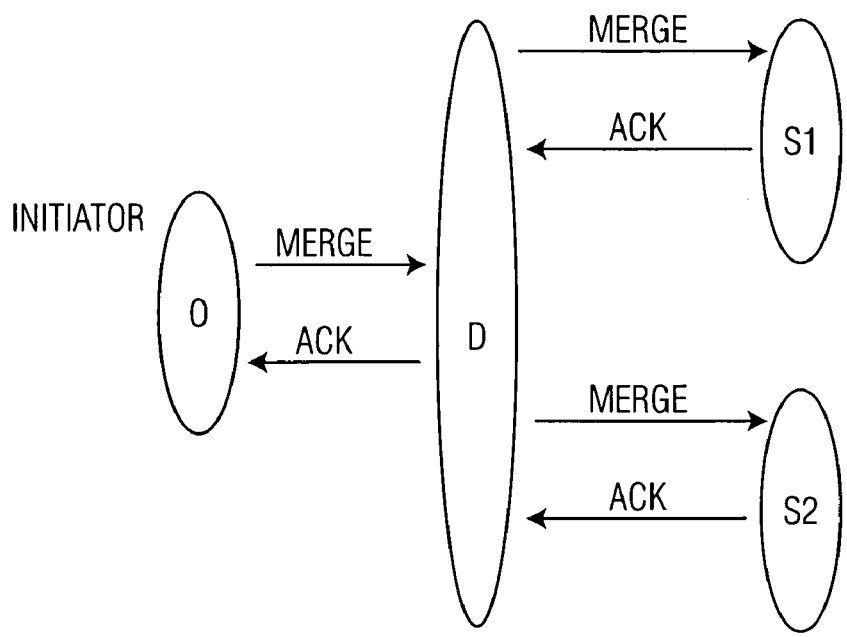
Figure 10C:
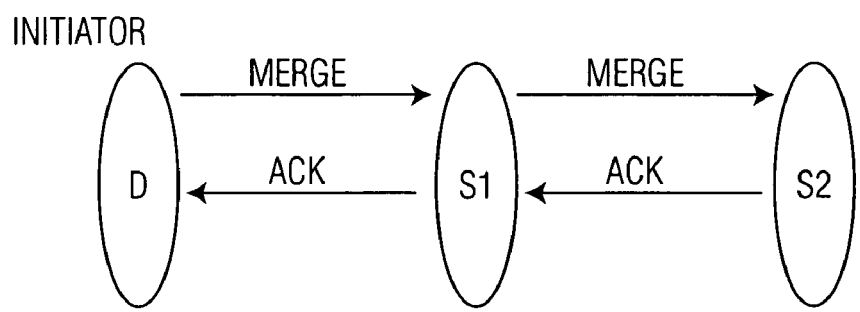

In FIG. 10A, node D is the an initiator of the MERGE operation. Node D sends respective MERGE messages to nodes S1 and S2. In this example, nodes S1 and S2 then send respective ACK reply response messages to node D. Once node D has received the ACK reply messages, the merged data transfer may begin. FIG. 10B is the same as FIG. 10A except that node O is the initiator and it sends the MERGE message to node D first. In FIG. 9C, node D is the initiator. Node D sends a MERGE message to node S1 and then node S1 sends a MERGE message to node S2. Node S2 responds to node S1 with an ACK message and node S1 responds to node D with an ACK message.

Figure 10D:
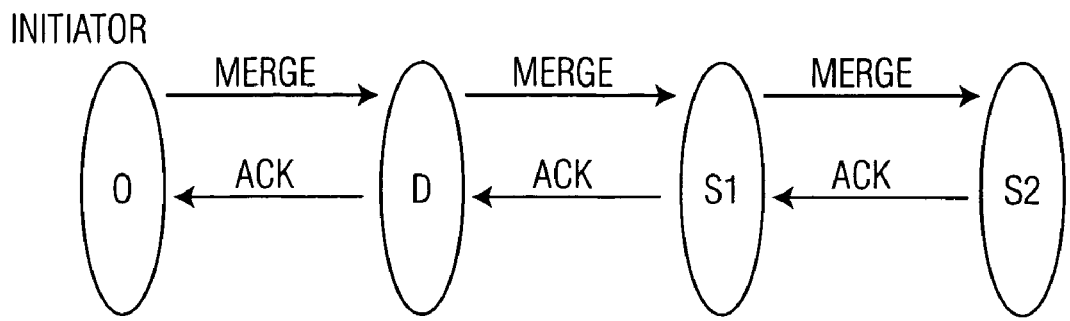
Figure 10E:
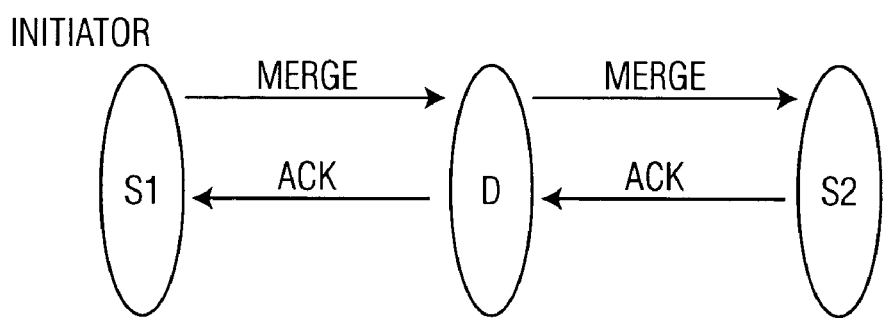
Figure 10F:
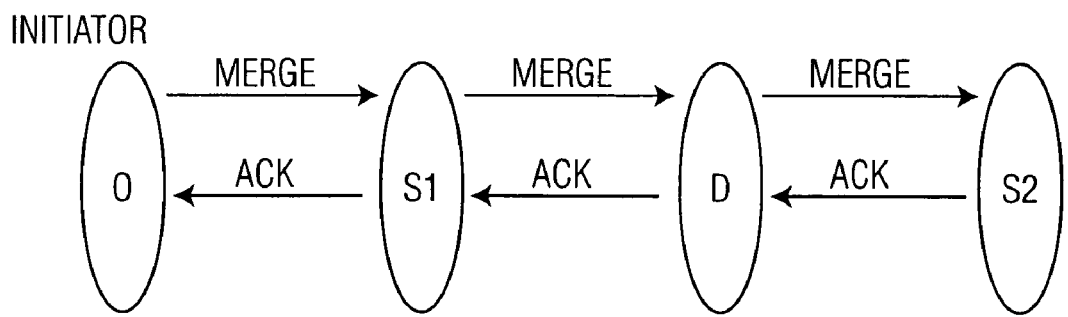
Figure 10G:
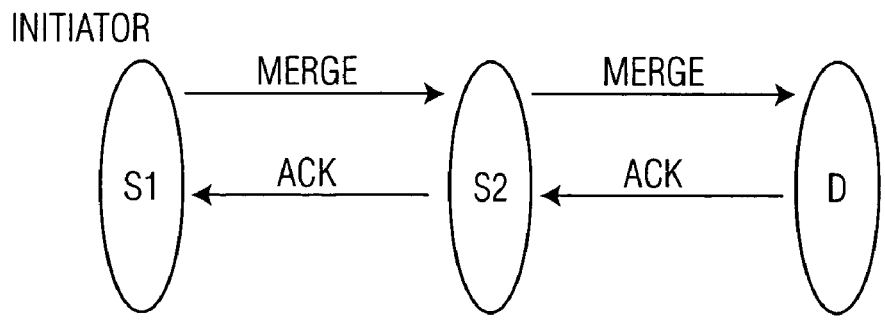
Figure 10H:
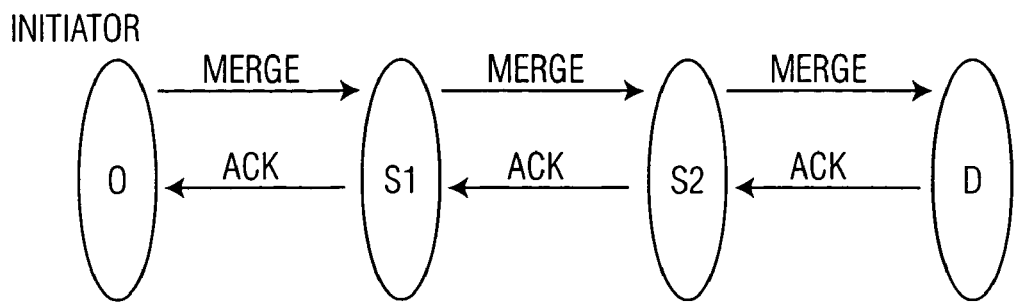
Figure 10I:
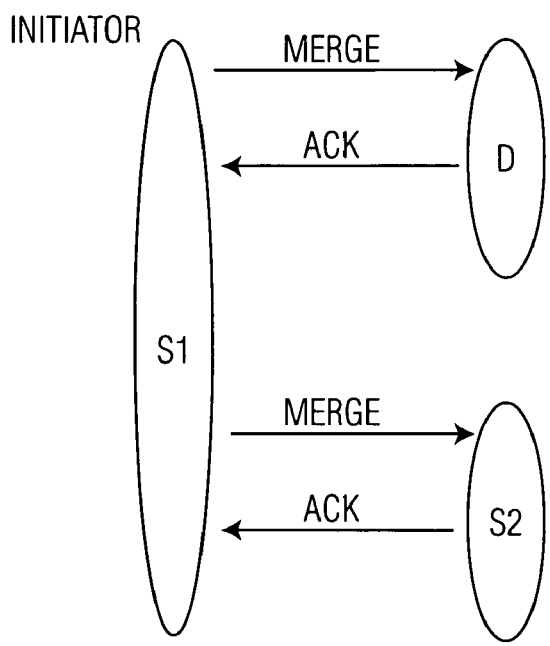
Figure 10J:
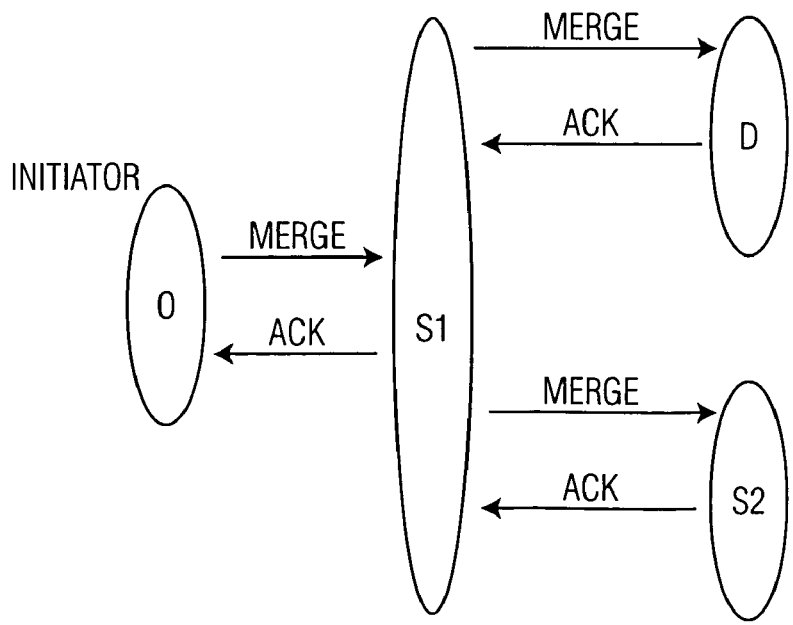

After node D receives the ACK message, the merged data transfer may begin. In this instance, node S1, in addition to sending its session data to node D, acts as a proxy for the session data that node S2 sends to node D. FIG. 10D is the same as FIG. 10C except that node O is the initiator. In FIG. 10E, node S1 is the initiator. It sends the MERGE message to node D and then node D sends the MERGE message to node S2. FIG. 10F is the same as FIG. 10E, except that node O is the initiator. In FIG. 10G, node S1 is again the initiator but it sends the MERGE message to node S2. Then node S2 sends a MERGE message to node D. FIG. 10H is the same as FIG. 10G except that node O is the initiator. In FIG. 10I, node S1 initiates the MERGE operation by sending respective MERGE messages to nodes D and S2. Nodes S and D2 reply to node D1 with respective ACK response messages. It is contemplated that nodes S1 and S2 may be swapped in FIG. 10I. FIG. 10J represents the same operation as shown in FIG. 10I except that node O is the initiator.

Incoming Session

FIGS. 11A through 11D show examples of a SEMP INCOMING SESSION operation according to the present invention. In these Figures, node P is a primary endpoint. Nodes D1 and D2 are the devices that cannot be primary endpoint, for example because they are not in the same network as the primary endpoint node P. In the example presented above, node 114 is a member of both the IP network 102 and the ad-hoc network formed with the television 116. In this example, television 116 can not receive an incoming call from the network 102. Telephone 114, however, may receive the incoming call. This operation of the SEMP protocol allows the telephone 114 to receive the incoming call as a proxy for the television 116. More generally, the INCOMING SESSION operation enables a secondary device that is not a primary endpoint to let the primary endpoint pick up a session on behalf of the secondary device. The presence of the primary endpoint in the ad-hoc network enables the devices in its coverage area to receive the incoming session even though these devices are not in the network over which the session is established. In the exemplary embodiment, the picked up session is immediately moved from the primary endpoint to the secondary by a MOVE operation. These devices, however, are in a personal area network (PAN) that also includes the primary endpoint node.

Figure 11A:
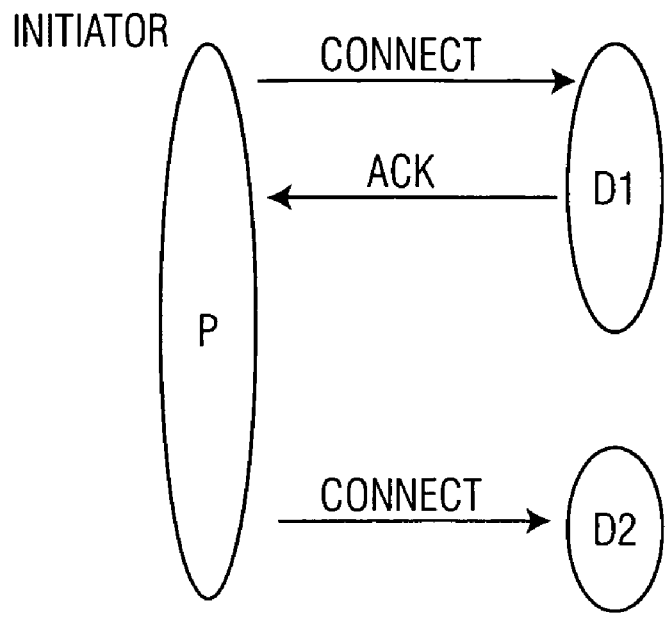
FIGS. 11A, 11B, 11C and 11D are network node diagrams that are useful for describing an INCOMING SESSION operation according to the present protocol.
Figure 11B:
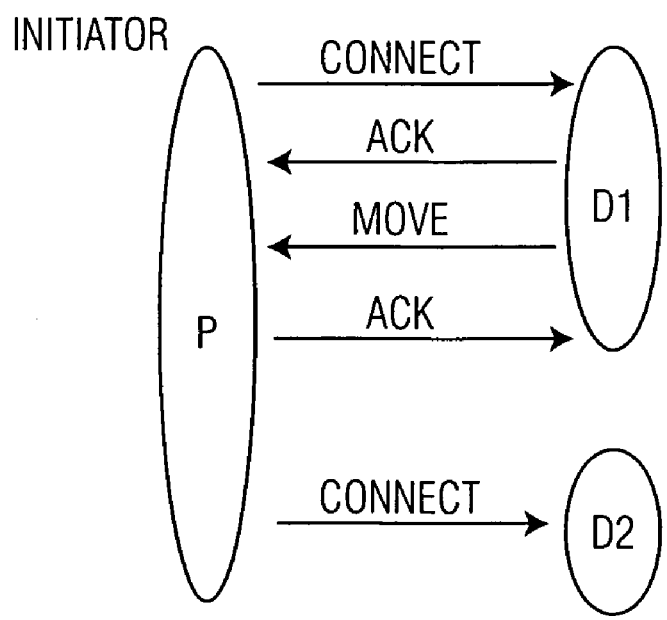
Figure 11C:
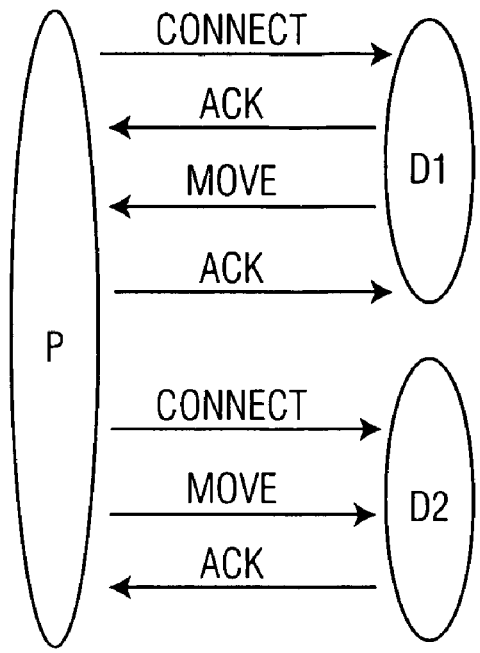
Figure 11D:
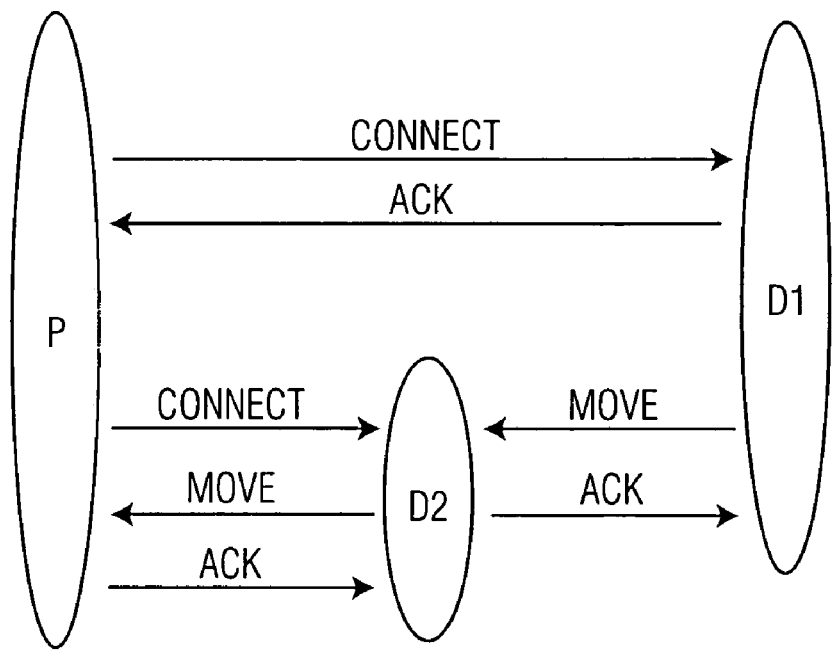

In FIG. 11A, node P receives the incoming session. Node P then broadcasts a CONNECT message to all devices in its coverage area. Nodes D1 and D2, which are within the coverage area, receive the CONNECT message. Node D1 replies with an ACK response message to node P causing node P to pick up the session. In FIG. 11B P again receives the incoming session and broadcasts a CONNECT message to all devices in its coverage area. As in the first example, node D1 replies with an ACK response message. Node D1 then immediately sends P a MOVE message (described above) to have the session endpoint moved from node P to node D1. In these examples, node D2 either does not respond or responds with a negative acknowledge (NAK) message. In FIG. 11C, node P receives of incoming session and broadcasts a CONNECT message to all devices in its coverage area. Node D1 again replies with an ACK response message. In this instance, however, node D1 does not want to participate in the session but, instead, wants node D2 to participate. Thus, node D1 immediately sends a MOVE message to node P to cause node P to move the session endpoint to D2. Node P then sends a MOVE message to node D2. In FIG. 11D, node P again receives the incoming session. Node P again broadcasts a CONNECT message to all devices in its coverage area. Node D1 replies an ACK response message. Node D1 then immediately sends a MOVE message to node D2 to cause node D2 to request the session endpoint from node P. Therefore node D2 sends a MOVE message to node P.

Outgoing Session

FIGS. 12A through 12D show examples of SEMP OUTGOING SESSION operations according to the present invention. As in FIGS. 11A through 11D, in FIGS. 12A through 12D, node P is a primary endpoint. Nodes D1 and D2 are the devices that cannot be primary endpoints. Nonetheless, node D1 wants to initiate a session on the network to which node P is connected. The exemplary SEMP OUTGOING SESSION operation allows a device that is, for example, in the same PAN as a device connected to the network to initiate a session over the network. Every device in the coverage area of the primary endpoint can initiate this operation even if the initiating device does not, itself, participate in the session. In these examples, the node P initiates the session and then moves the established session from the primary endpoint to the secondary device, using the MOVE operation.

Figure 12A:
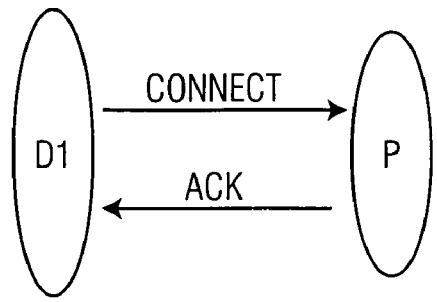
FIGS. 12A, 12B, 12C and 12D are network node diagrams that are useful for describing an OUTGOING SESSION operation according to the present invention.
Figure 12B:
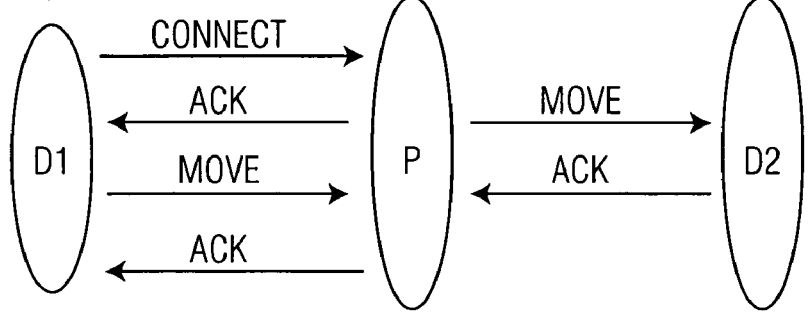
Figure 12C:
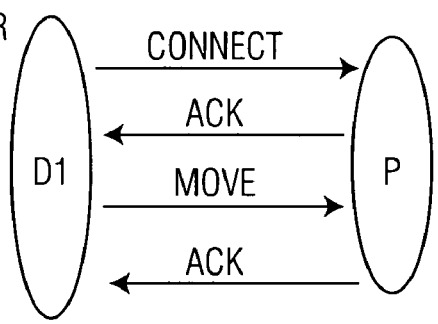
Figure 12D:
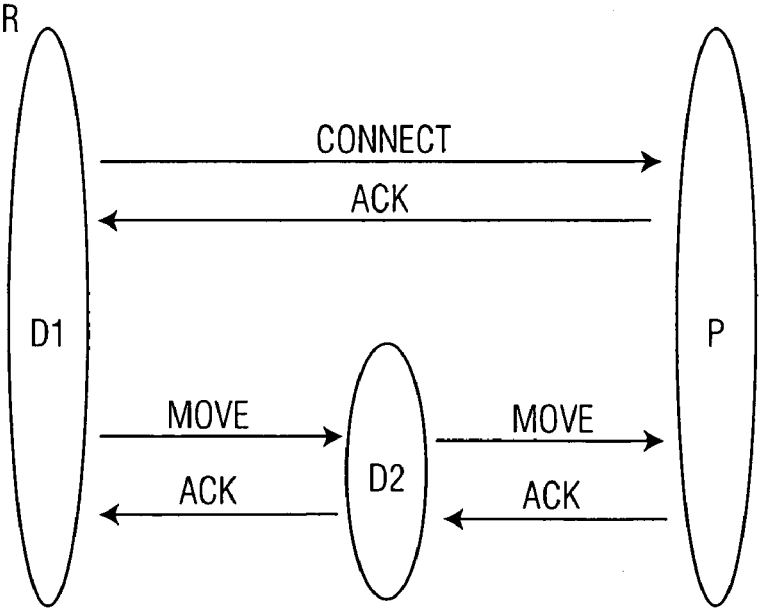

In FIG. 12A, node P is an initiator of the outgoing session. Node D1 sends node P a CONNECT message to cause node P to establish the session with the node outside the ad hoc network. Node P replies with an ACK response message to D1 and then establishes the requested session. In FIG. 12B, node P is again the initiator of outgoing sessions. Node D1 sends a CONNECT message to node P, to cause it to establish the session with the node outside the ad hoc network. Node P then replies with an ACK response message to node D1 and node P then establishes the requested session. Node D1 immediately sends a MOVE message to node P to cause node P to move the session endpoint of established session to node D1. In FIG. 12C, node P is again the initiator of the outgoing session. Node D1 again sends a CONNECT message to node P, to cause it to establish the session with the node outside the ad hoc network. Node P replies with an ACK response message to node D1. Node P then establishes the requested session. In this example, however, node D1 wants to have node D2 as the session endpoint. Thus, node D1 immediately sends a MOVE message to node P to cause node P to move the session endpoint to node D2. Thus, node P sends a MOVE message to node D2 to establish node D2 as the secondary endpoint, as described above. In FIG. 12D, node P is again the initiator of the outgoing session. Node D1 sends node P a CONNECT message to establish the session with the node outside the ad hoc network. Node P replies an ACK response message to node D1 establishes the requested session. Node D1 immediately sends a MOVE message to node D2 to get the session endpoint from P. Accordingly, node D2 sends a MOVE message to node P.

Although the invention has been described in terms of exemplary embodiments, it is contemplated that it may be practiced as described above within the scope of the following claims.

The invention claimed is:

1. A method for managing session endpoints in an ad-hoc network environment including a first device and at least one local device, and a primary network environment including a correspondent node, the method comprising the steps of:
   exchanging session description messages between the correspondent node and the first device to establish the first device as the primary endpoint of an internet protocol (IP) session between the first device and the correspondent node;
   discovering, by the first device, an identity of the at least one local device;
   receiving, by the first device, information describing any IP sessions in which the at least one local device is participating, from the at least one local device via a session description information message; and
   sending, by the first device, a MOVE message to establish the at least one local device as a secondary endpoint of the IP session established between the first device and the correspondent node.

2. The method according to claim 1, wherein the step of discovering the identity of the at least one local device includes the step of performing a device discovery operation according to a predetermined device discovery protocol.

3. The method according to claim 1, wherein the step of discovering the identity of the at least one local device further includes the steps of:
   sending, by the first device, a device information message requesting device capability data; and sending, by the at least one local device, in response to the device information message, a further device information message, including capability data of the at least one local device, to the first device.

4. The method according to claim 1, wherein the step of receiving the session description information from the at least one local device further includes the step of receiving device capability information from the at least one local device via the session description information message.

5. The method according to claim 1, further including the step of sending, by the first device a further session description information message describing the IP session between the first device and the correspondent node, to the at least one local device.

6. The method according to claim 1, further including the steps of:
configuring the at least one local device to receive and process data of the IP session, in response to the MOVE message; and
forwarding, by the first device, the session data to the at least one local device.

7. The method according to claim 6 wherein the step of configuring the at least one local device to receive and process the session data is performed by the at least one local device in response to commands received by the at least one local device from a user.

8. The method according to claim 6 wherein the step of configuring the at least one local device to receive and process the IP session data is performed by the at least one local device in response to commands received by the at least one local device from the first device.

9. A system, comprising:
a first device,
plurality of local devices,
a primary network environment including a correspondent node, and
a protocol for managing session endpoints in an ad-hoc network system, the protocol comprising:
session description messages exchanged between the correspondent node and the first device to establish the first device as the primary endpoint of an internet protocol (IP) session between the first device and the correspondent node;
an information message which is sent by one of the first device or at least one local device to request information from or provide information to at least one of the plurality of local devices in the ad-hoc network; and
a MOVE message which is sent by one of the plurality of local devices to one of the first device or an other device of the plurality of local devices to cause the first device to establish the other device as a secondary endpoint of the IP session, the MOVE message includes
a PRIMARY ENDPOINT field which identifies the first device,
a FROM field which identifies a device of the plurality of devices which is sending the message, and
a TO field which identifies a further device of the plurality of devices to which the message is addressed, wherein the further device is to be established as the secondary endpoint of the IP session.

10. The system according to claim 9, wherein the information message includes:
an information-type field which identifies a type of information being requested or provided;
an information-state field which indicates whether the message is requesting or providing information; and
a content field which contains any information provided by the information message.

11. The system according to claim 9 wherein the IP session includes multiple portions and the protocol further includes a SPLIT message which is sent by one of the plurality of devices to establish first and second ones of the plurality of devices as secondary endpoints of respectively different portions of the IP session.

12. The system according to claim 11, further including a MERGE message which is sent by one of the plurality of devices to establish one device of the plurality of devices as the secondary endpoint of the portions of the single IP session established in the first and second ones of the plurality of devices.

13. The system according to claim 9, further including a CONNECT message which is sent by one of the plurality of devices to the first device to notify the first device of an incoming IP session or to cause the first device to initiate an IP session.

14. The system according to claim 13, further including a TERMINATE message which is sent by one of the plurality of devices to the first device to cause the first device to terminate the IP session.

15. A method for managing an endpoint of a logical internet protocol (IP) session in a first device to selectively extend the endpoint to at least one local device that is within a coverage area of the first device, the method comprising the steps of:
receiving, by the first device a session description message to establish the first device as a primary endpoint of the logical IP session;
discovering, by the first device, an identity of the at least one local device;
receiving, by the first device, session participating information describing any IP sessions in which the at least one local device is participating, from the at least one local device via a session description information message; and
sending, by the first device, a MOVE message to establish the at least one local device as a secondary endpoint of the logical IP session with the first device remaining as the primary endpoint of the logical IP session.

16. The method according to claim 15, wherein the step of discovering the identity of the at least one local device includes the step of performing a device discovery operation according to a device discovery protocol.

17. The method according to claim 16, wherein the step of discovering the identity of the at least one local device further includes the step of sending a device capability information message from the at least one local device to the first device.

18. The method according to claim 1, wherein the information describing any IP session includes a session description specified by a session description protocol.

19. The method according to claim 1, wherein the IP session is a file transfer protocol session.

20. The method according to claim 1, wherein the information describing any IP session in which the at least one local device is participating includes information regarding each of a plurality of IP sessions in which the at least one local device is an endpoint or a transfer node in a multi-hop link.

* * * * *